(12) United States Patent  
Uebo

(10) Patent No.: US 7,932,855 B2  
(45) Date of Patent: Apr. 26, 2011

(54) DISTANCE MEASURING DEVICE AND DISTANCE MEASURING METHOD

(75) Inventor: Tetsuji Uebo, Wakayama (JP)

(73) Assignee: Saika Technological Institute Foundation, Wakayama-Shi (JP)

( * ) Notice: Subject to any disclaimer, the term of this patent is extended or adjusted under 35 U.S.C. 154(b) by 305 days.

(21) Appl. No.: 11/991,384

(22) PCT Filed: Aug. 25, 2006

(86) PCT No.: PCT/JP2006/316683  
§ 371 (c)(1),  
(2), (4) Date: Mar. 3, 2008

(87) PCT Pub. No.: WO2007/029519  
PCT Pub. Date: Mar. 15, 2007

(65) Prior Publication Data  
US 2009/0251360 A1     Oct. 8, 2009

(30) Foreign Application Priority Data

Sep. 2, 2005 (JP) .................................. 2005-255595  
Mar. 1, 2006 (JP) .................................. 2006-054485

(51) Int. Cl.  
*G01S 13/00* (2006.01)  
*G01S 13/08* (2006.01)

(52) U.S. Cl. .......... 342/129; 342/70; 342/118; 342/192; 342/196

(58) Field of Classification Search .............. 342/70–72, 342/118, 128, 129, 130, 192, 195, 196, 200  
See application file for complete search history.

(56) References Cited

U.S. PATENT DOCUMENTS 4,238,795 A * 12/1980 Schiek et al. ................. 342/127  
(Continued)

FOREIGN PATENT DOCUMENTS

WO       WO 03104841 A1 * 12/2003

OTHER PUBLICATIONS

"Short Range Radar Utilizing Standing Wave or Millimeter Wave" Uebo et al. Proceedings of the IEEE Intelligent Vehicles Symposium, 2001.*

(Continued)

*Primary Examiner* — Thomas H Tarcza  
*Assistant Examiner* — Peter M Bythrow  
(74) *Attorney, Agent, or Firm* — Kratz, Quintos & Hanson, LLP

(57) ABSTRACT

There are provided a distance measuring device and a distance measuring method characterized by "simple configuration", "capability of measuring a near distance", and "a small measurement error" like a distance measuring device using a standing wave. The distance measuring device includes a signal source (1) for outputting a signal having a plurality of different frequency components within a particular bandwidth, a transmission unit (2) for transmitting a signal as an undulation, s mixed wave detection unit (3) for detecting a mixed wave VC obtained by mixing a progressive wave VT transmitted and a reflected wave VRk of the progressive wave VT reflected by a measurement object (6), a frequency component analysis unit (4) for analyzing the frequency component of the mixed wave VC detected, and a distance calculation unit (5) for obtaining a distance spectrum by subjecting the analyzed data further to spectrum analysis, thereby calculating the distance to the measurement object (6).

19 Claims, 22 Drawing Sheets

U.S. PATENT DOCUMENTS

| | | | | |
|---|---|---|---|---|
| 5,748,295 | A * | 5/1998 | Farmer | 356/5.09 |
| 6,037,895 | A * | 3/2000 | Uehara | 342/70 |
| 6,040,898 | A * | 3/2000 | Mrosik et al. | 356/5.09 |
| 6,052,080 | A * | 4/2000 | Magori | 342/118 |
| 6,181,273 | B1 * | 1/2001 | Heide et al. | 342/130 |
| 6,469,662 | B2 * | 10/2002 | Tullsson | 342/195 |
| 7,145,502 | B2 * | 12/2006 | Uebo et al. | 342/131 |
| 7,233,388 | B2 * | 6/2007 | Fujimori et al. | 356/4.01 |
| 2004/0119966 | A1 * | 6/2004 | Iritani et al. | 356/4.09 |
| 2006/0023571 | A1 * | 2/2006 | Uebo et al. | 367/101 |

OTHER PUBLICATIONS

Machine Translation of WO03104841A1 provided by EPO, description from corresponding document EP1512987.*

* cited by examiner

[Fig.1]
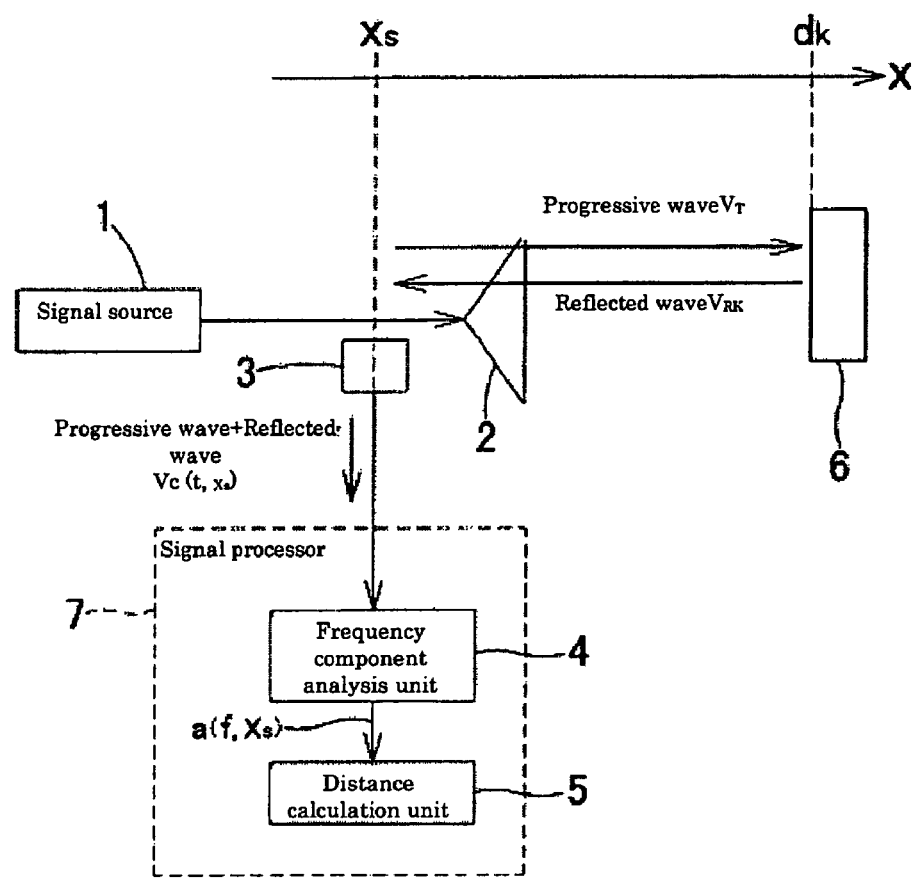

[Fig.2]
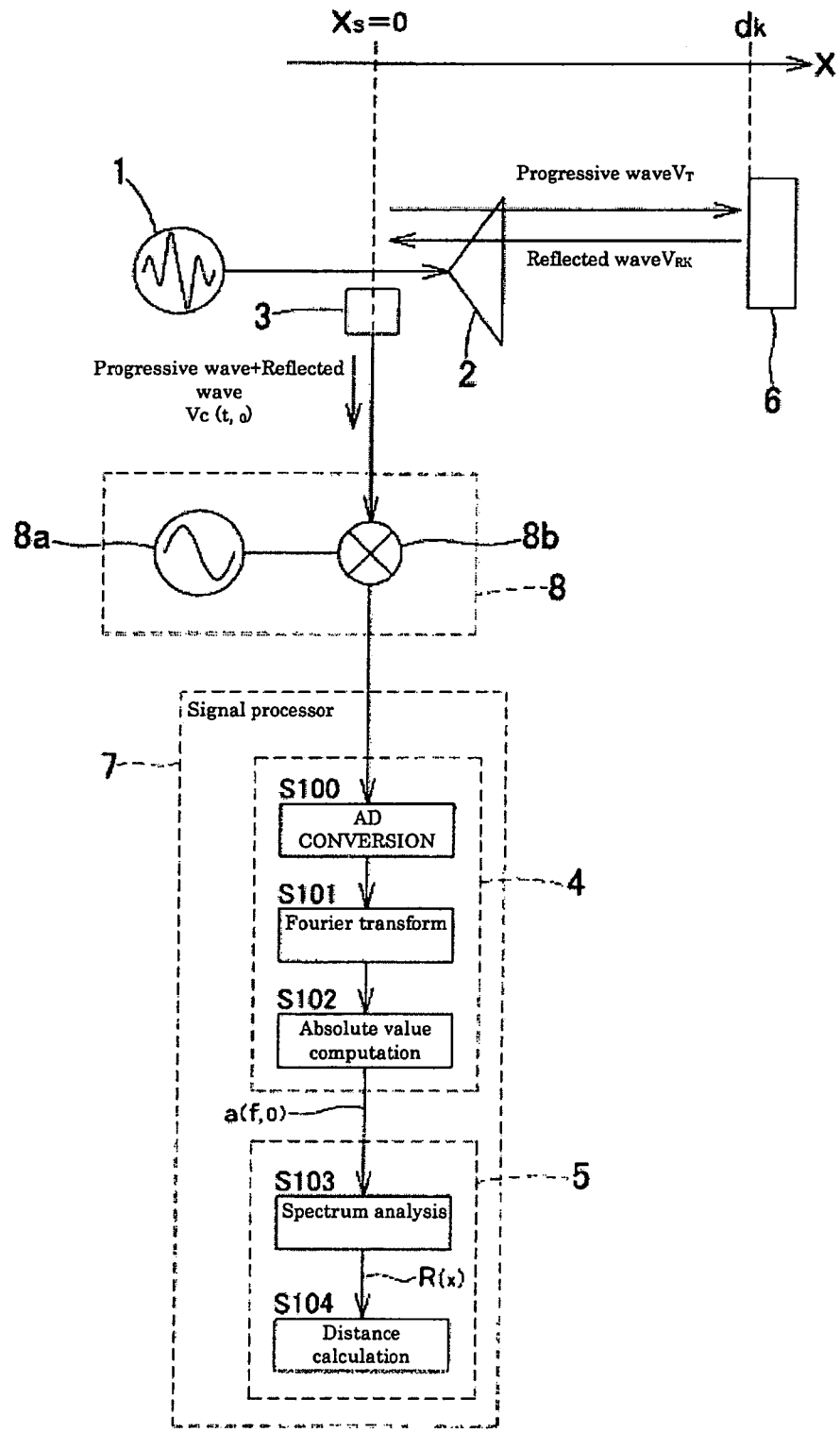

[Fig.3]
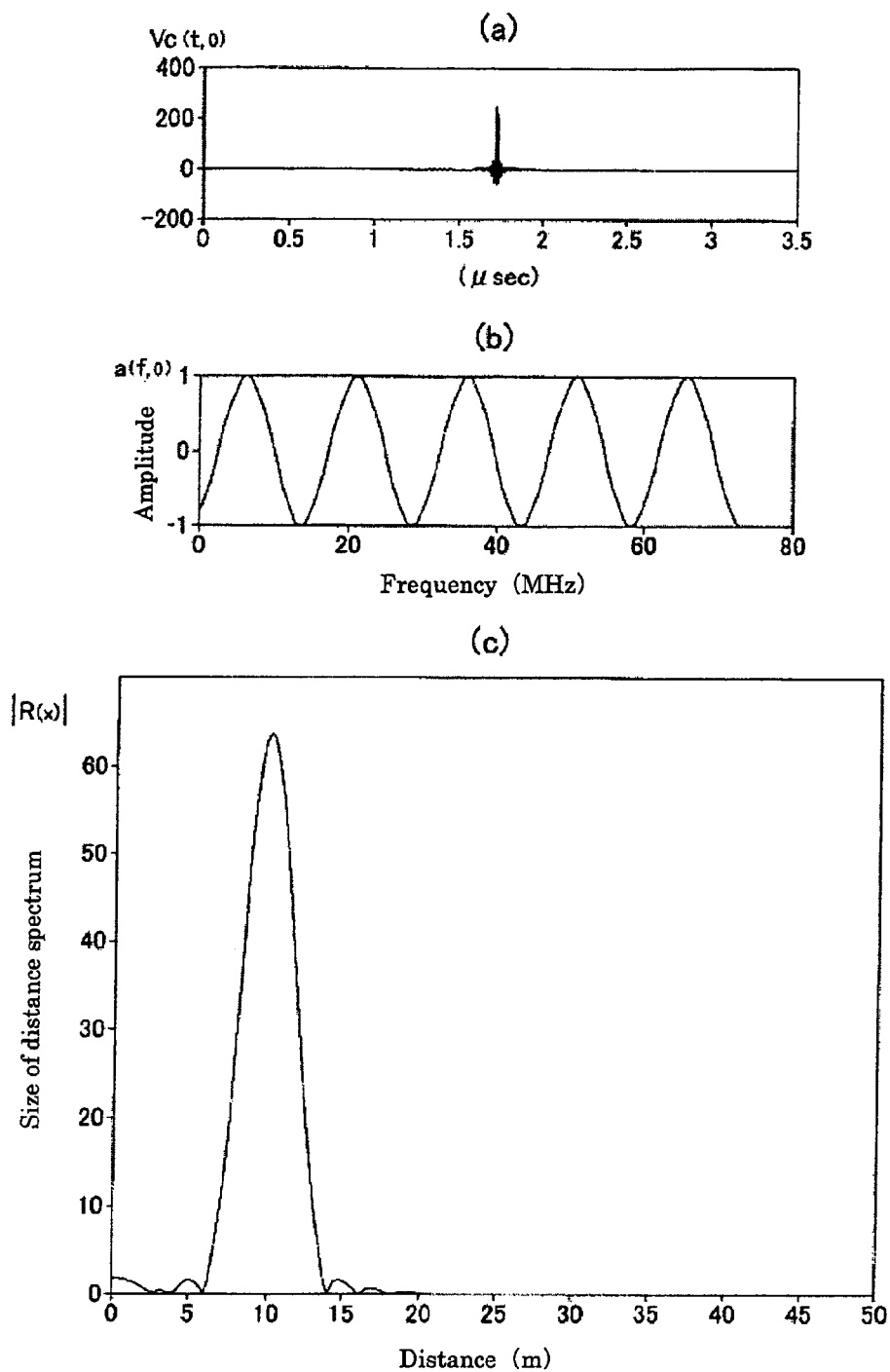

[Fig.4]
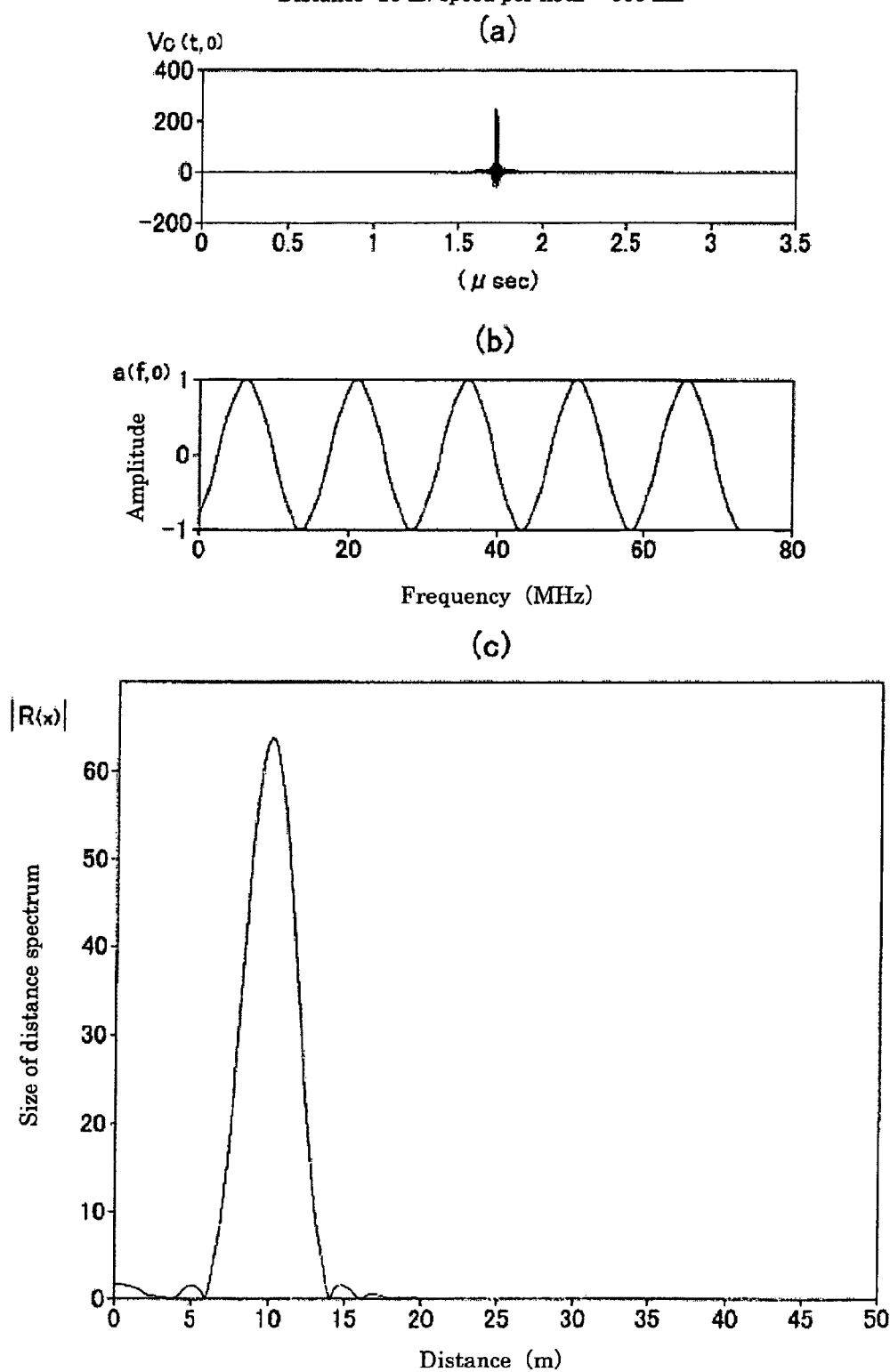

[Fig.5]
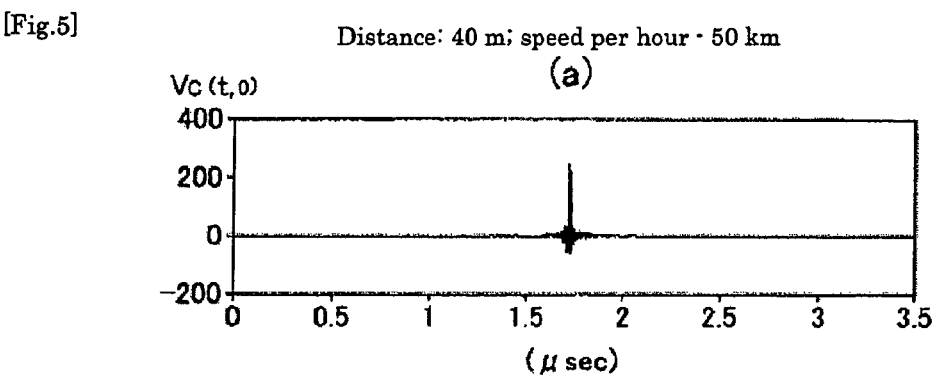
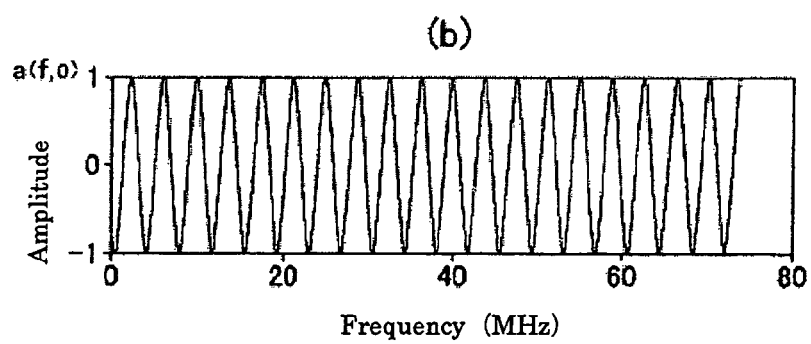
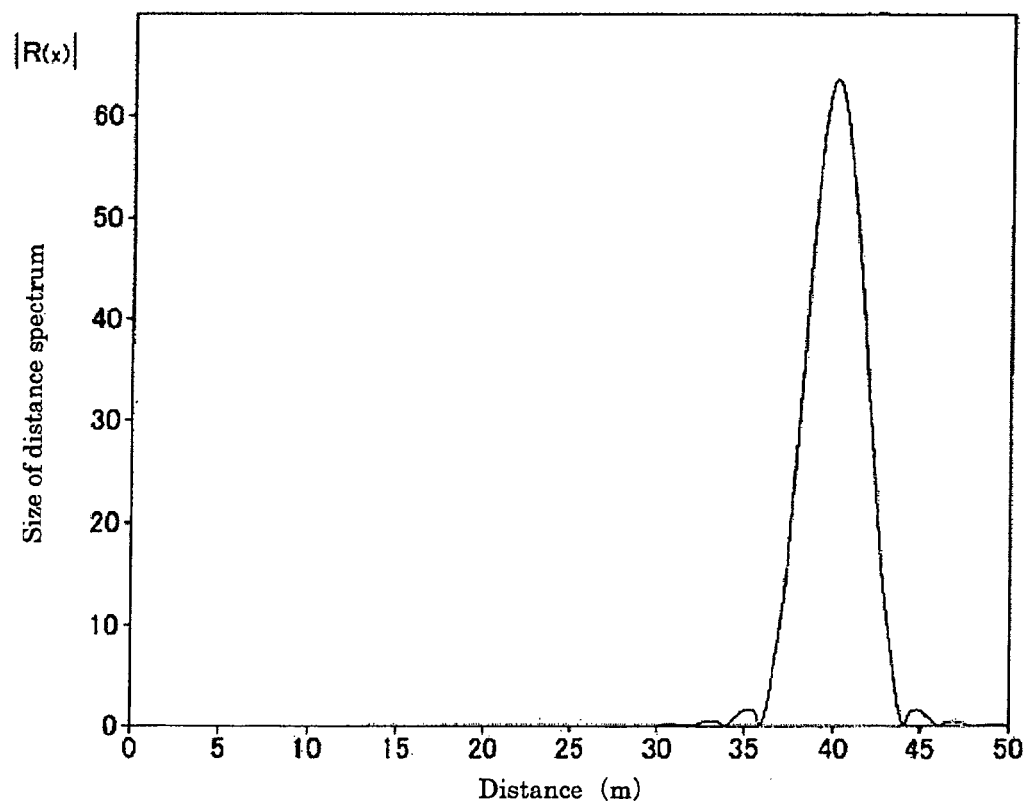

[Fig.6] Distance: 5 m; speed per hour + 100 km
and distance: 12.5 m; speed per hour -300 km
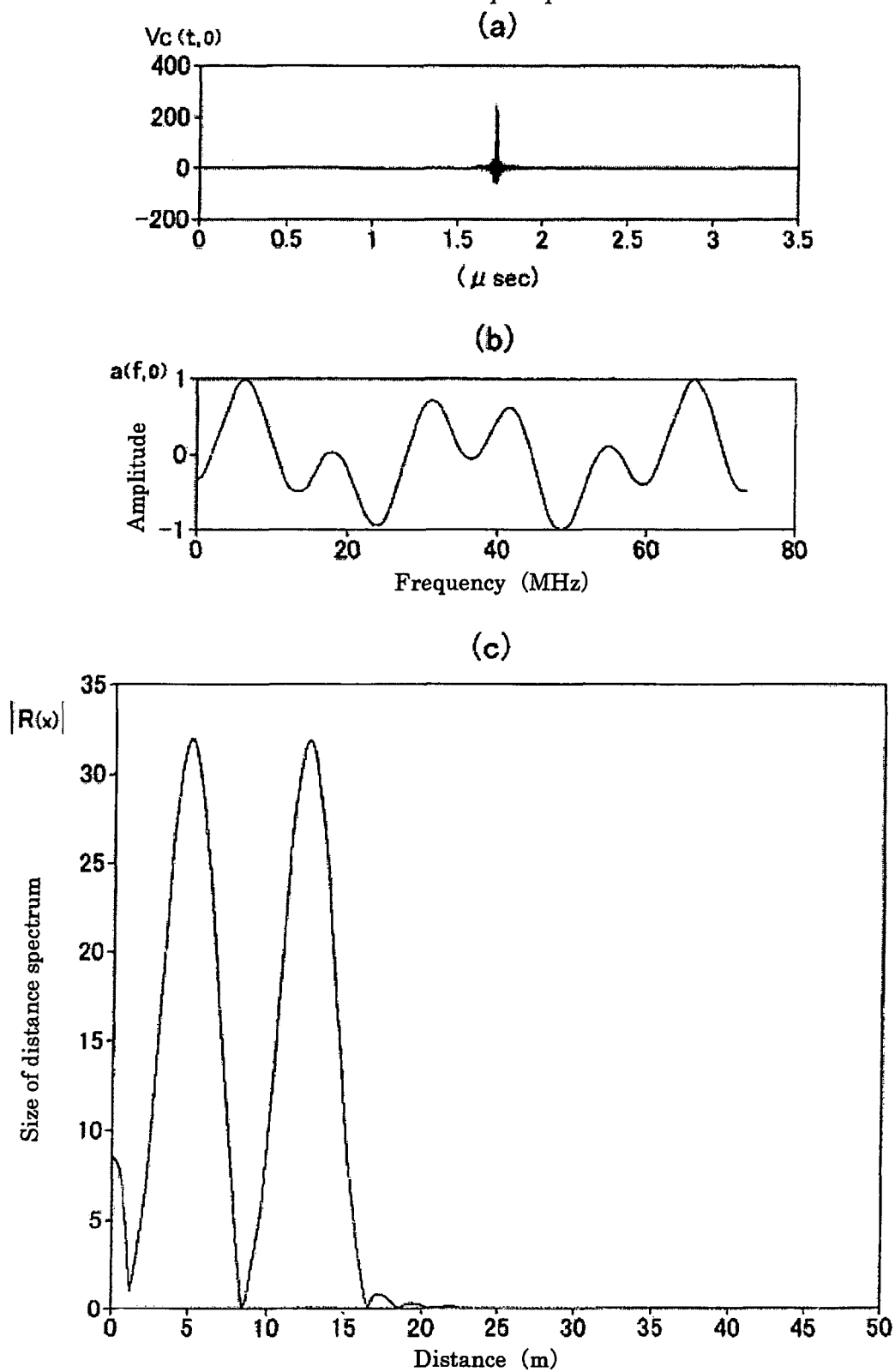

[Fig.7]
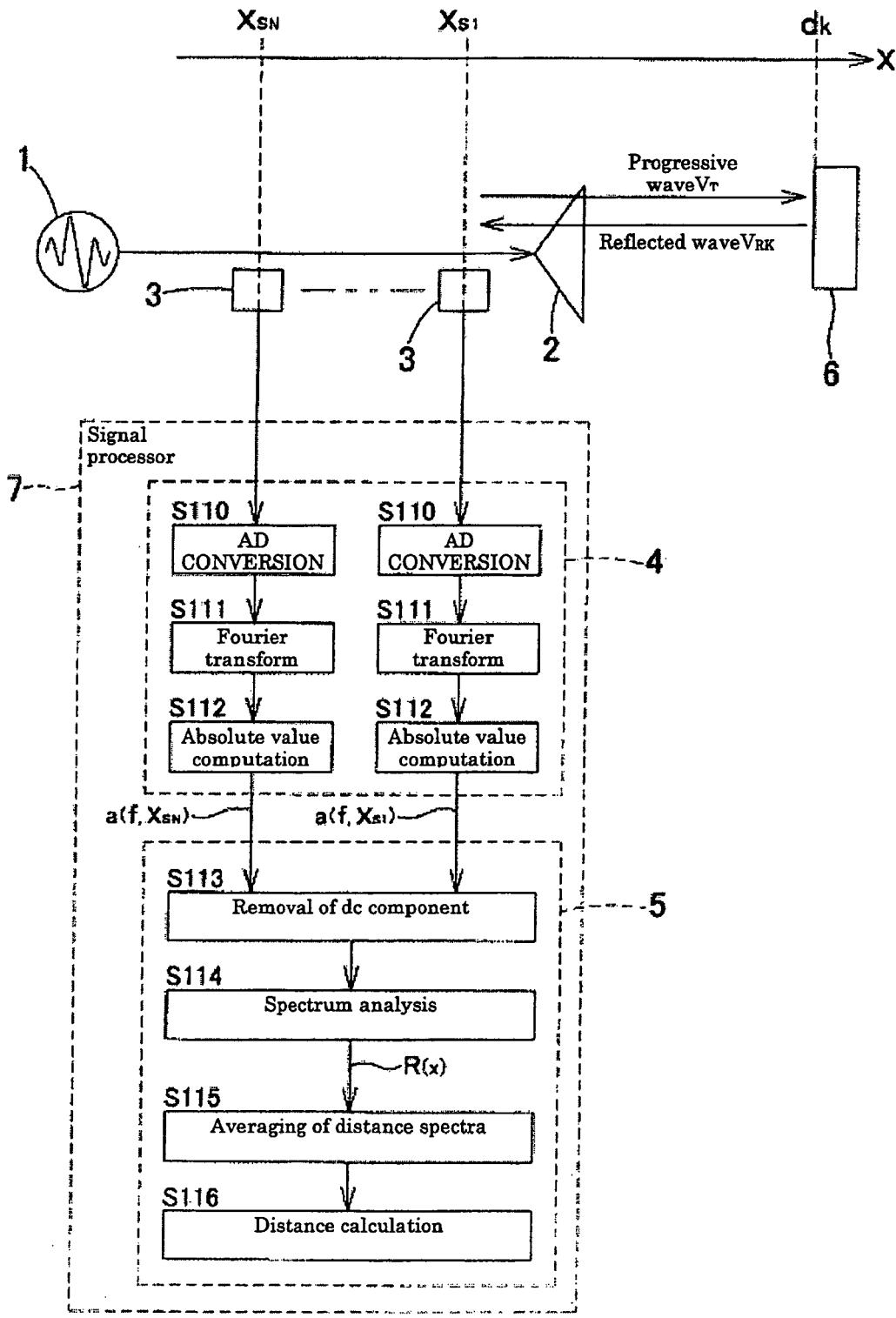

[Fig.8]
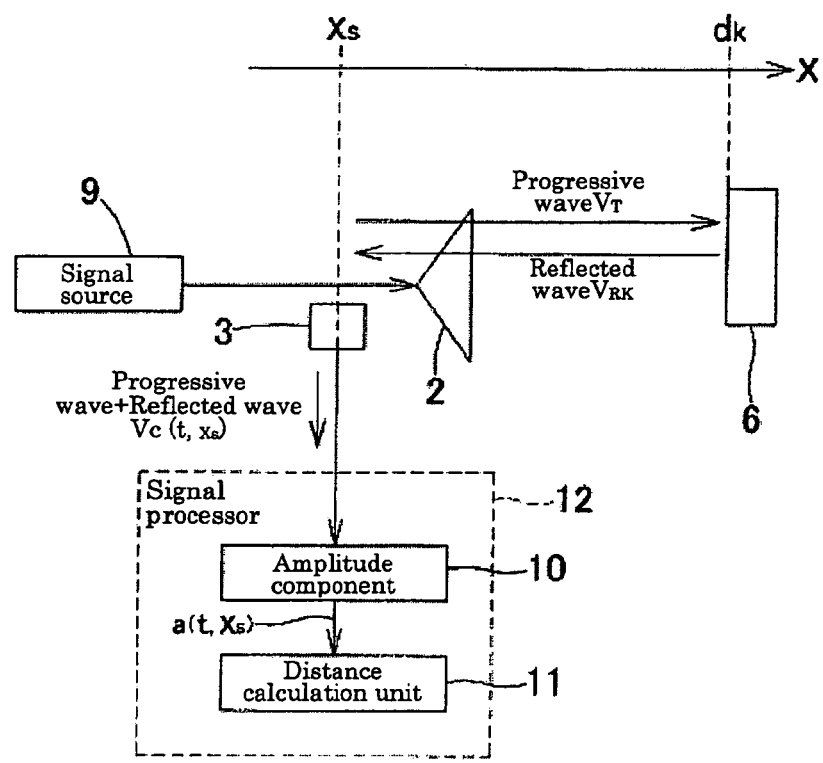

[Fig.9]
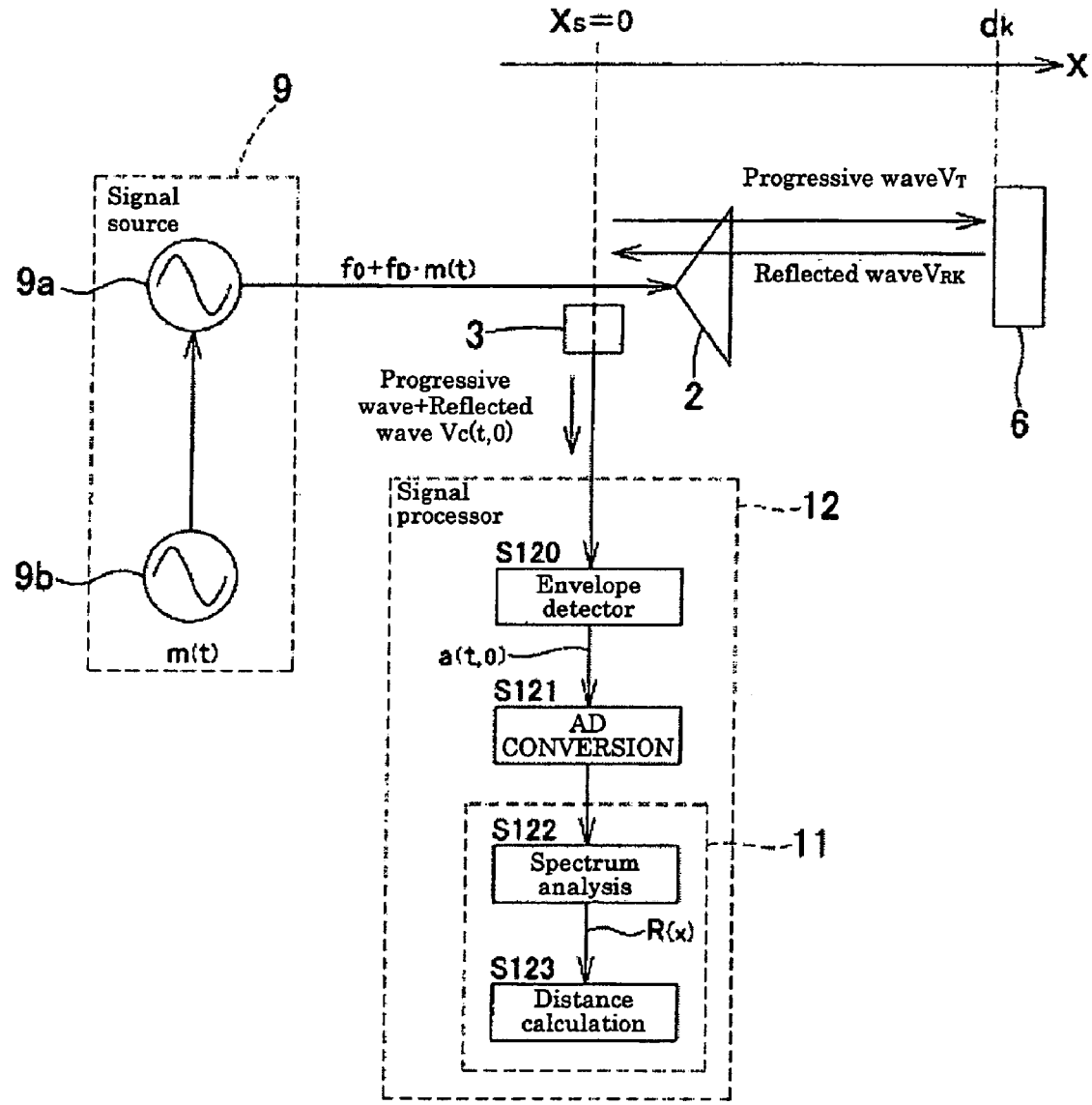

[Fig.10]
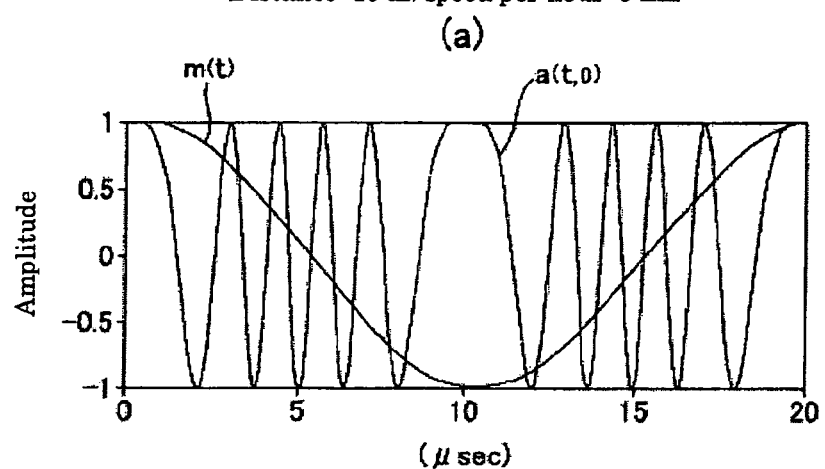
(a)
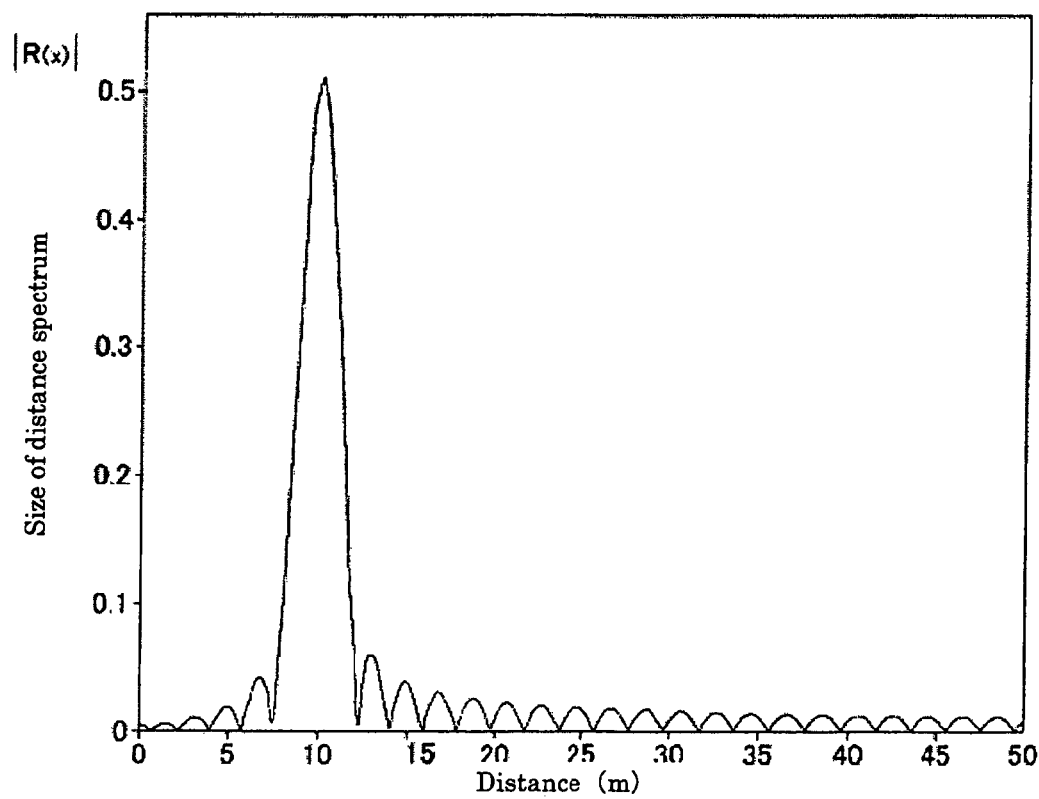
(b)

[Fig.11]
Distance 10m, speed per hour+300km
(a)
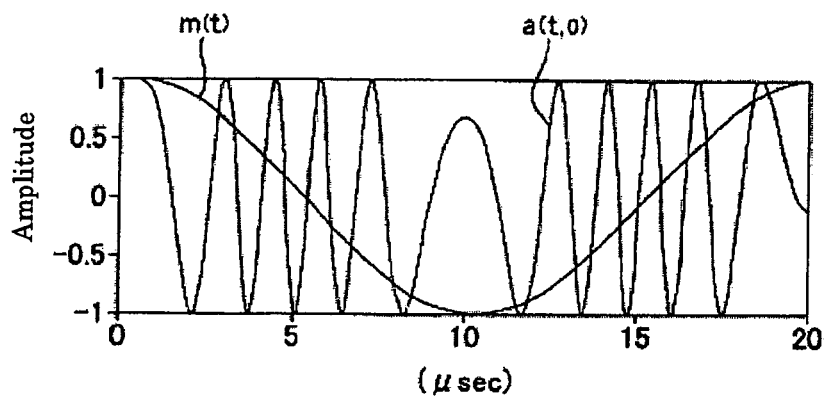
(b)
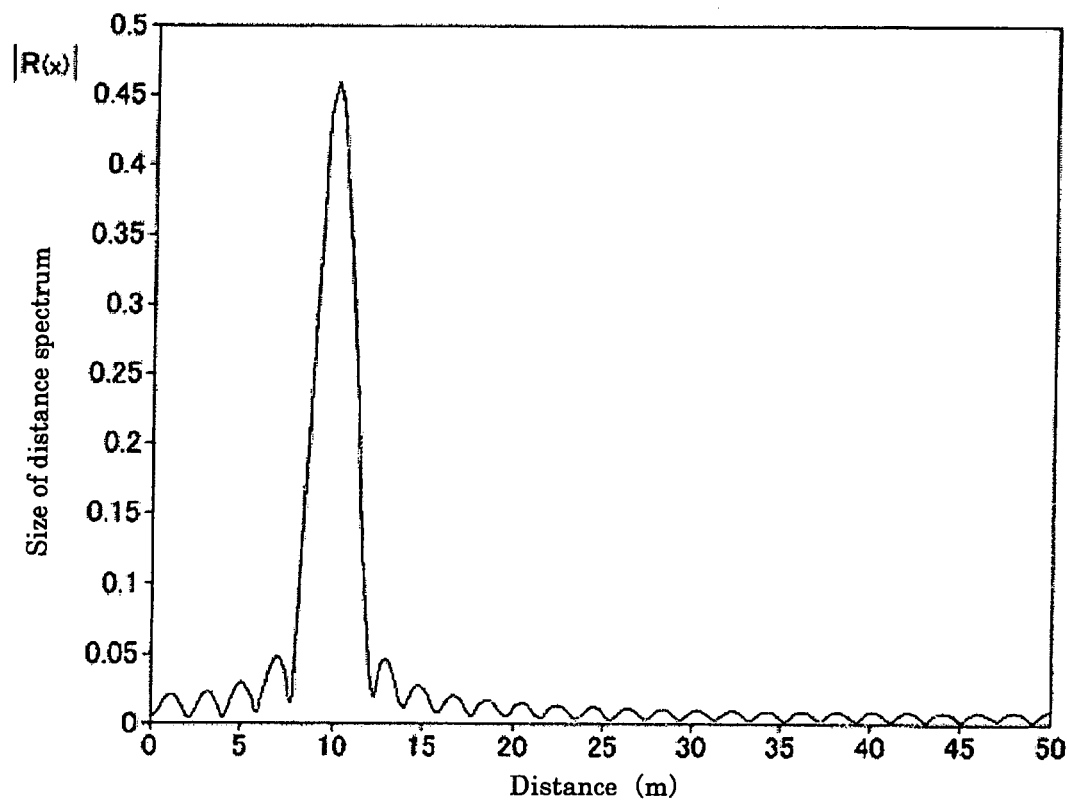

[Fig.12]
Distance40m, speed per hour-50km
(a)
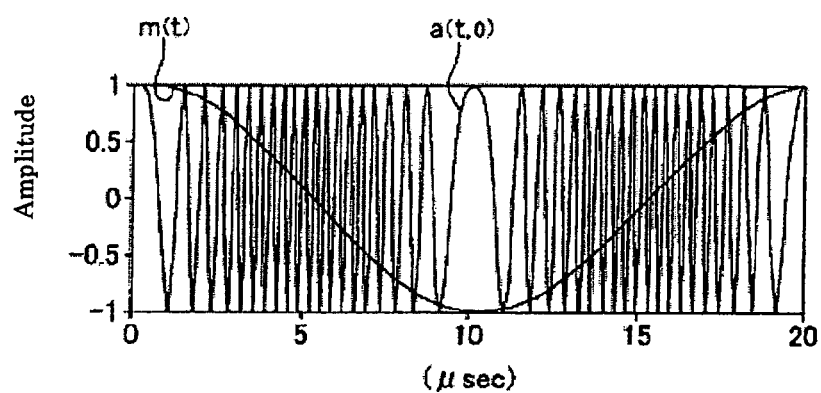
(b)
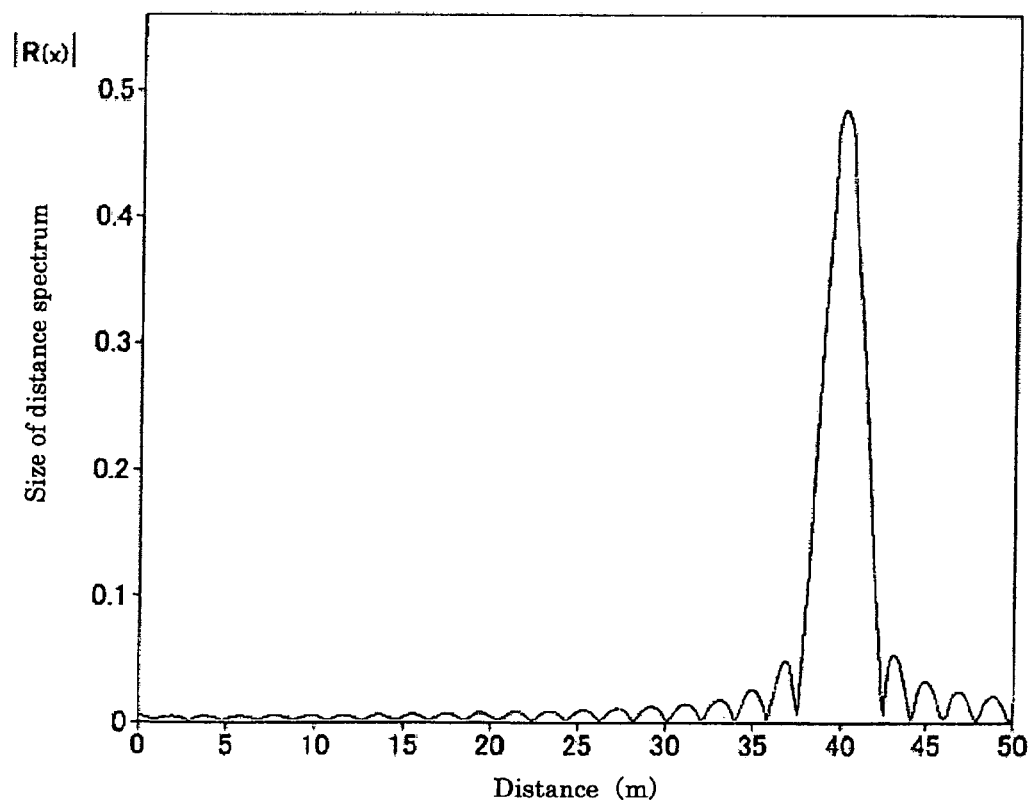

[Fig.13]
Distance 5m, speed per hour +100km, and Distance 12.5m, speed per hour -300km
(a)
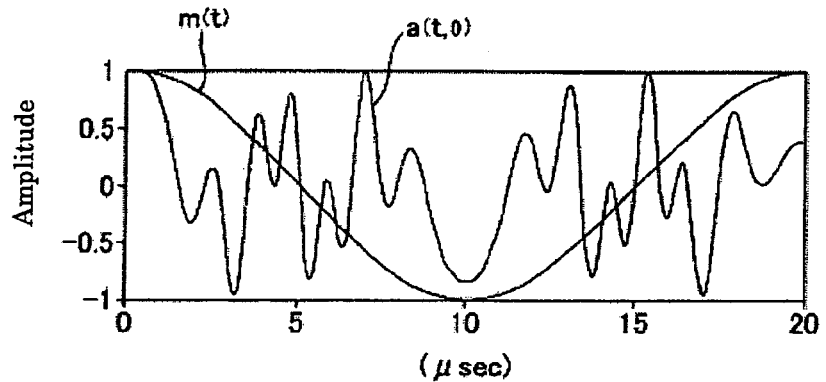
(b)
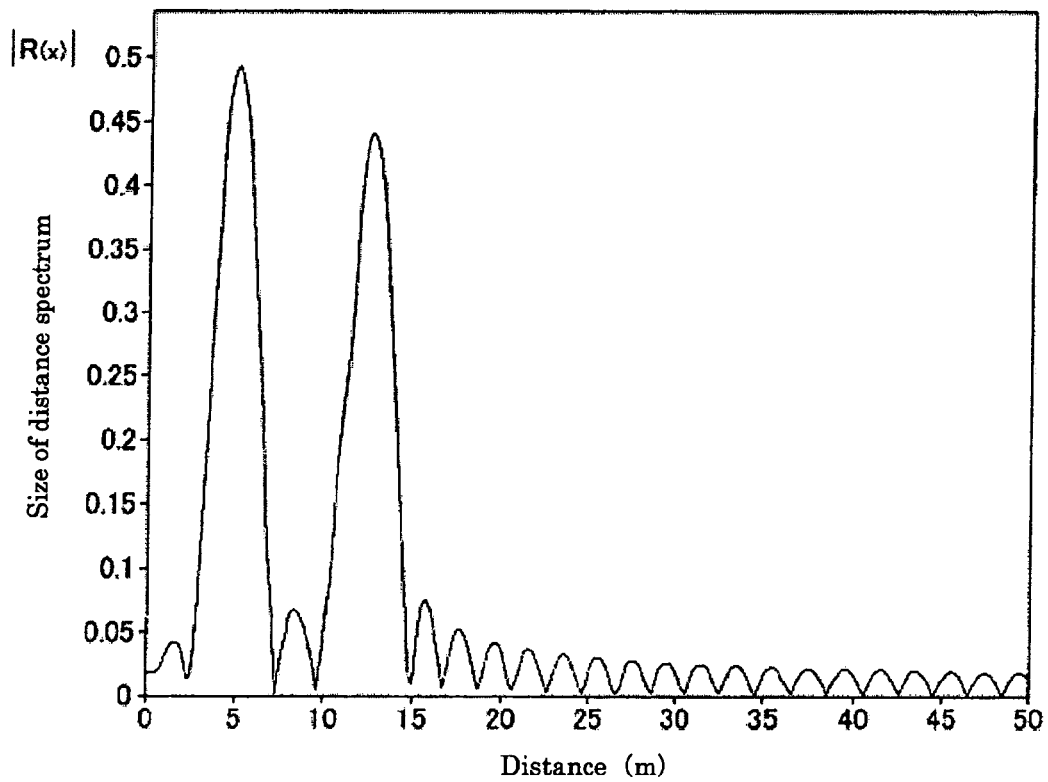

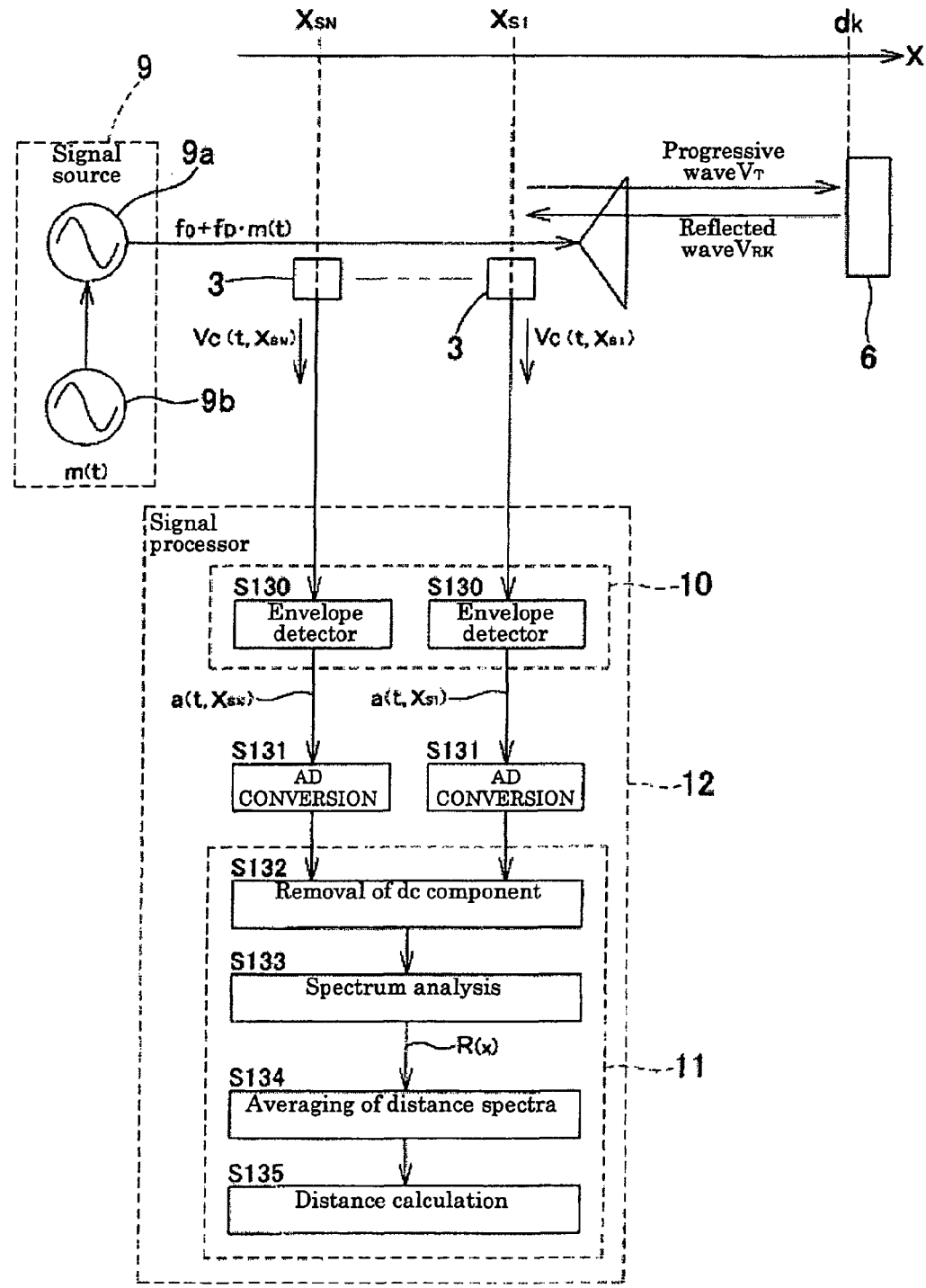
[Fig.14]

[Fig.15]
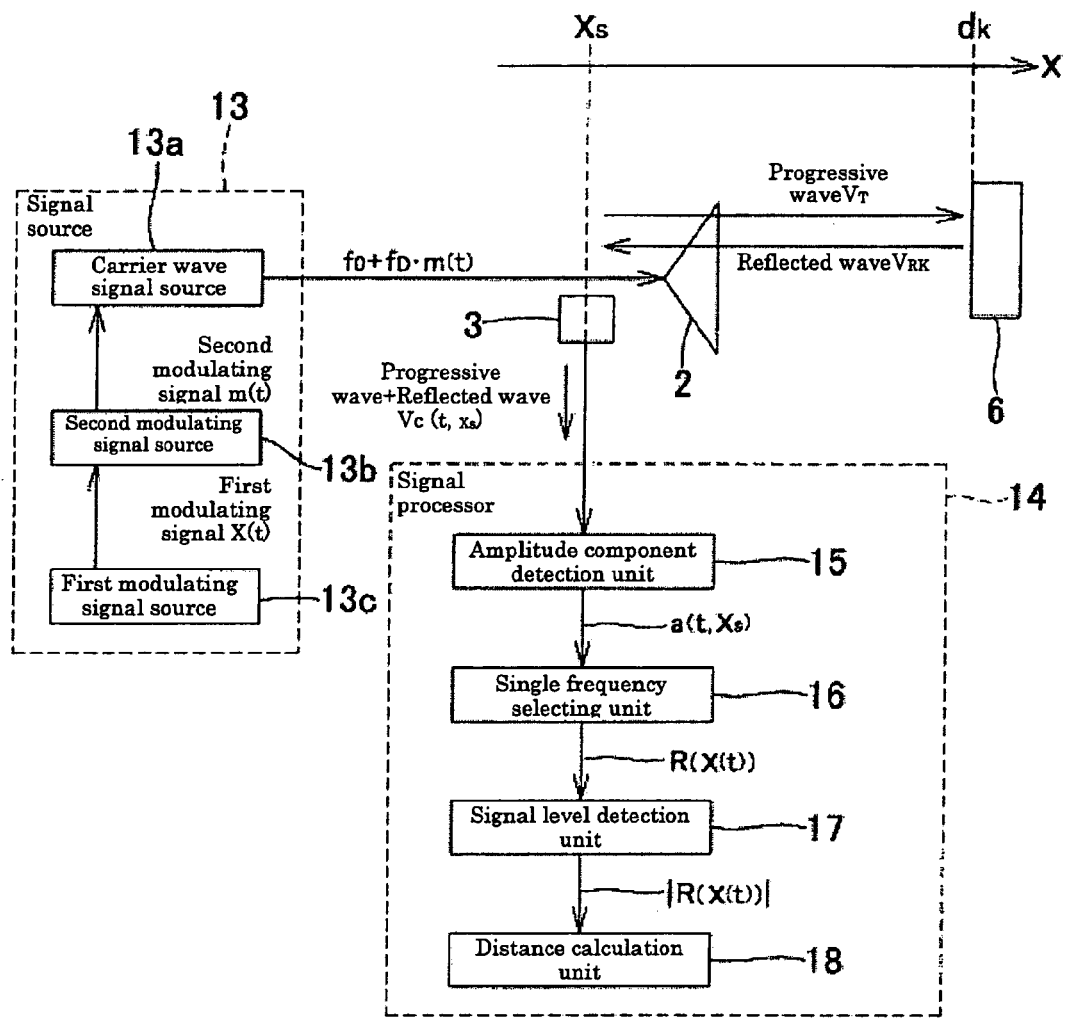

[Fig.16]
(a)
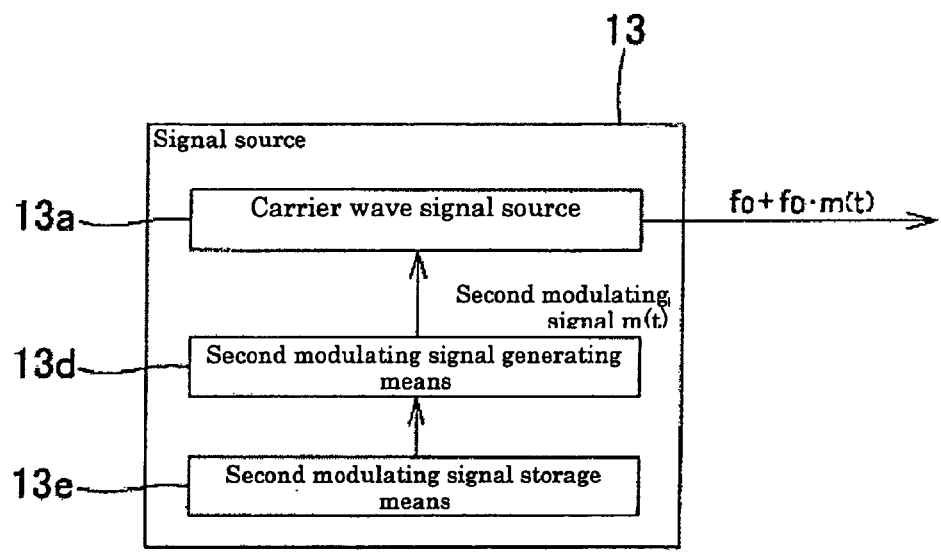
(b)
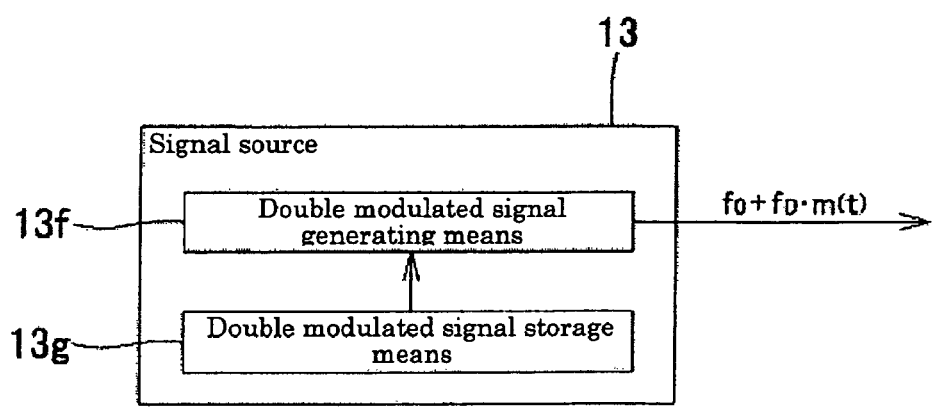

[Fig.17]
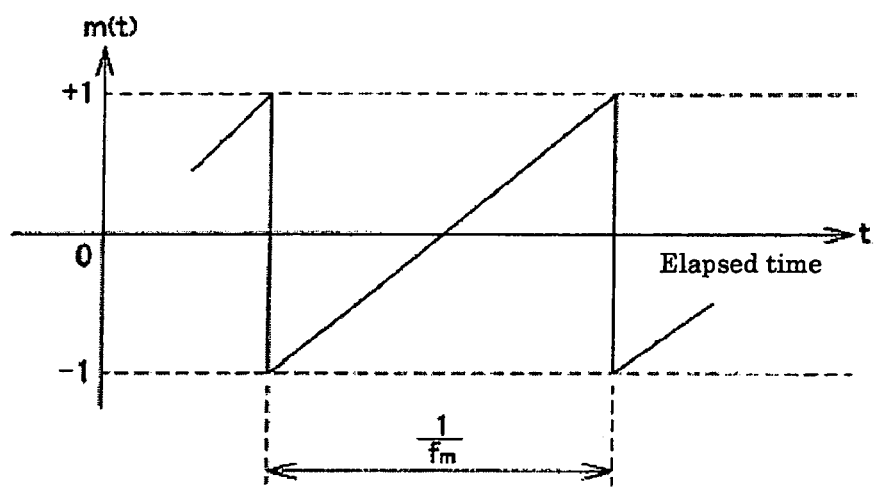
[Fig.18]
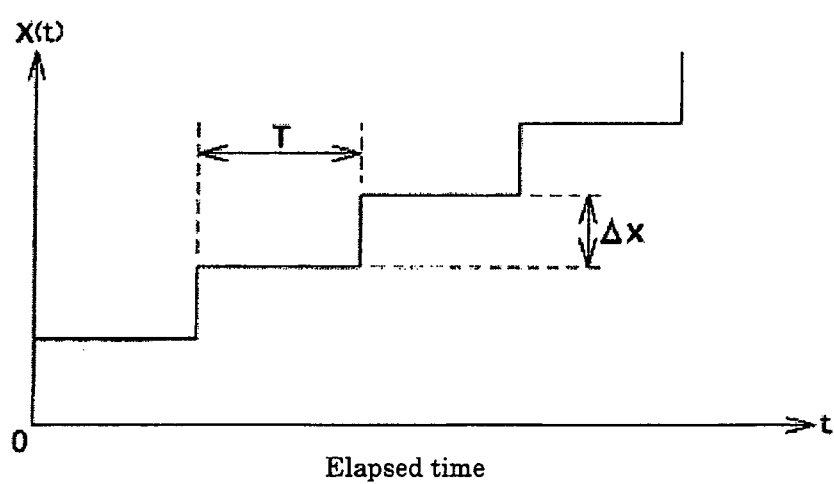

[Fig.19]
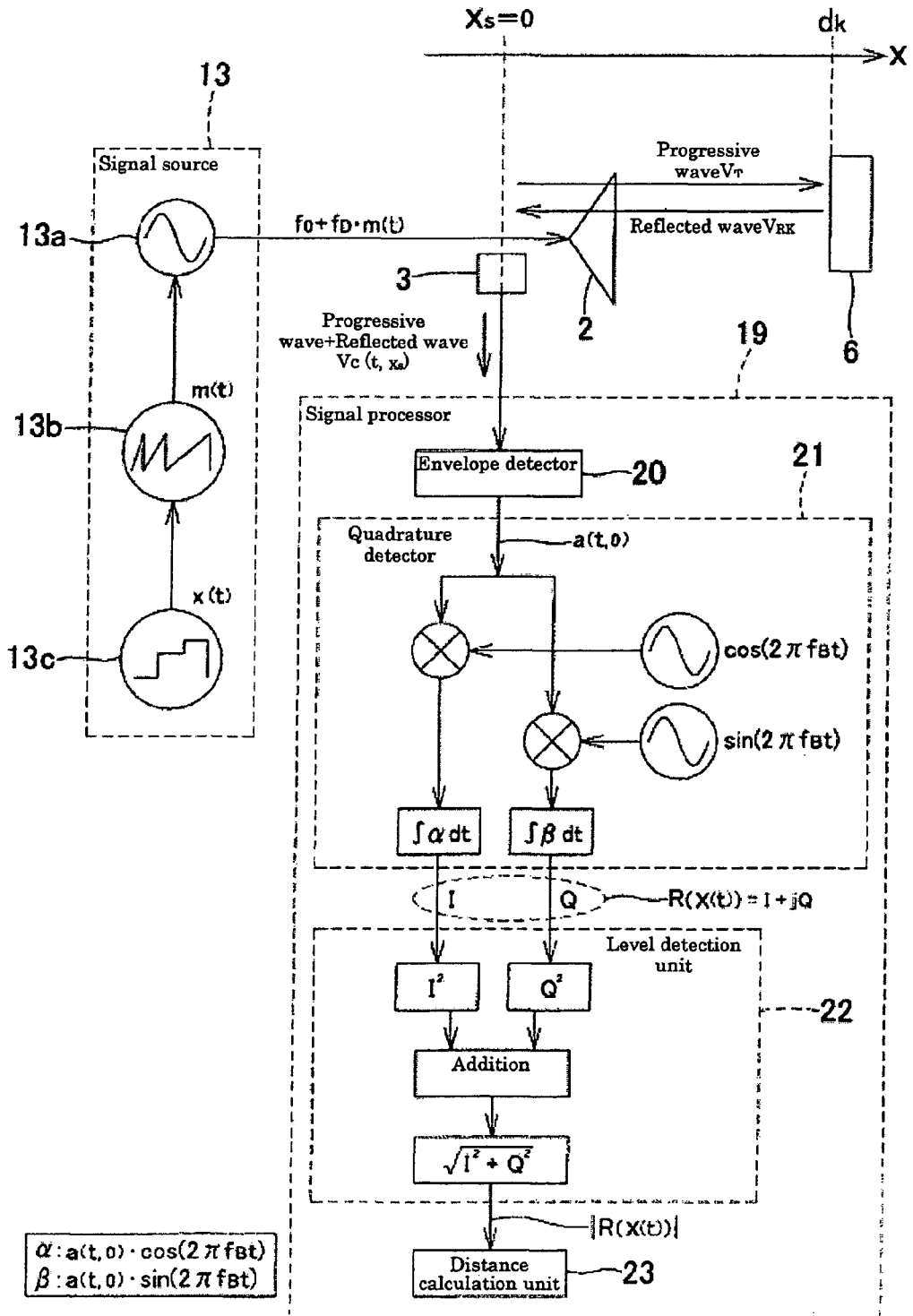

[Fig.20]
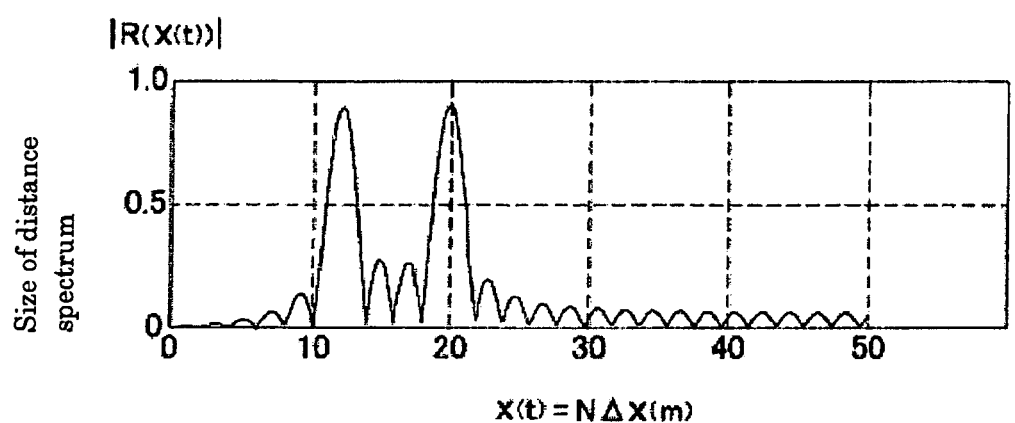

[Fig.21]
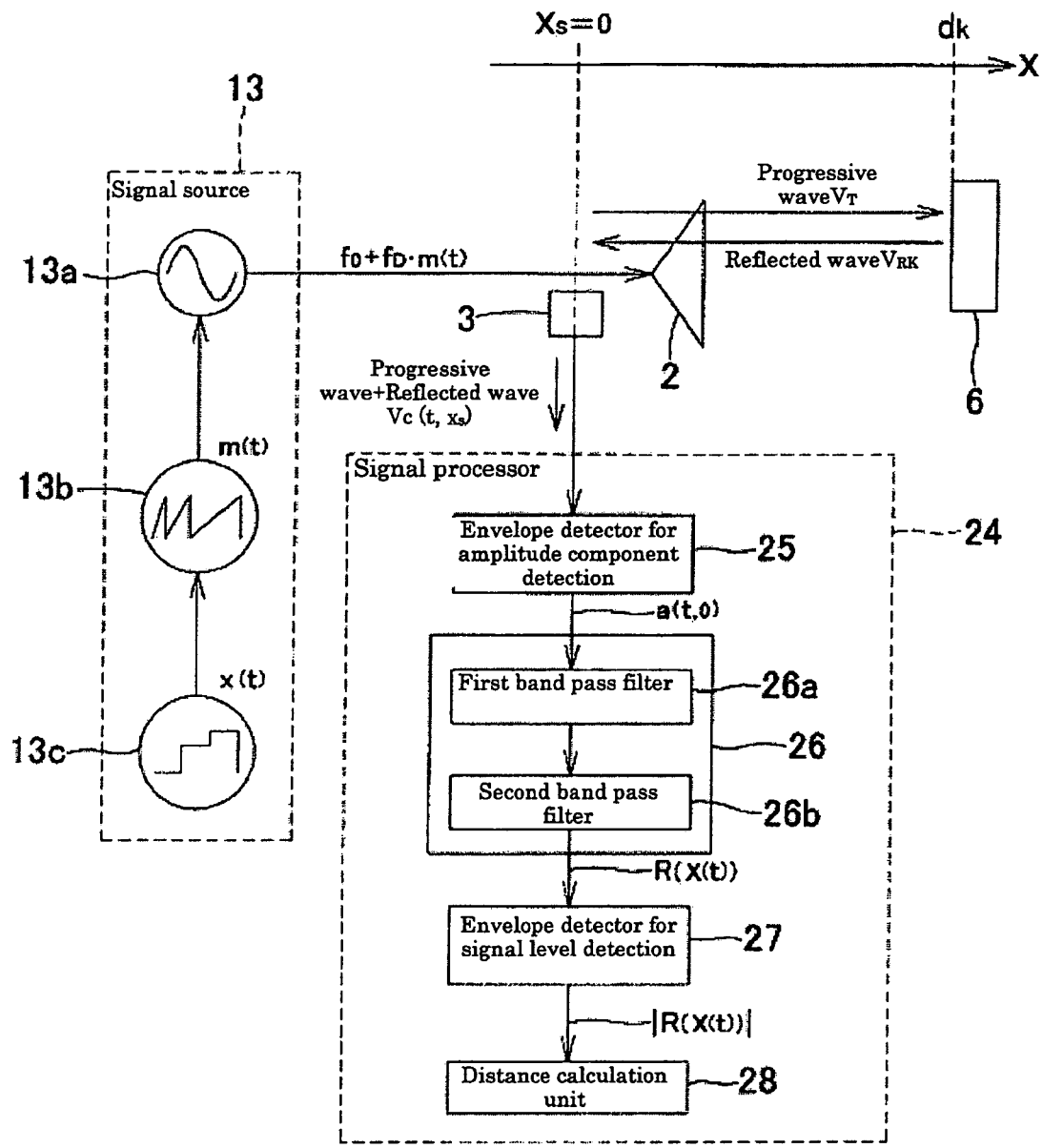

[Fig.22]
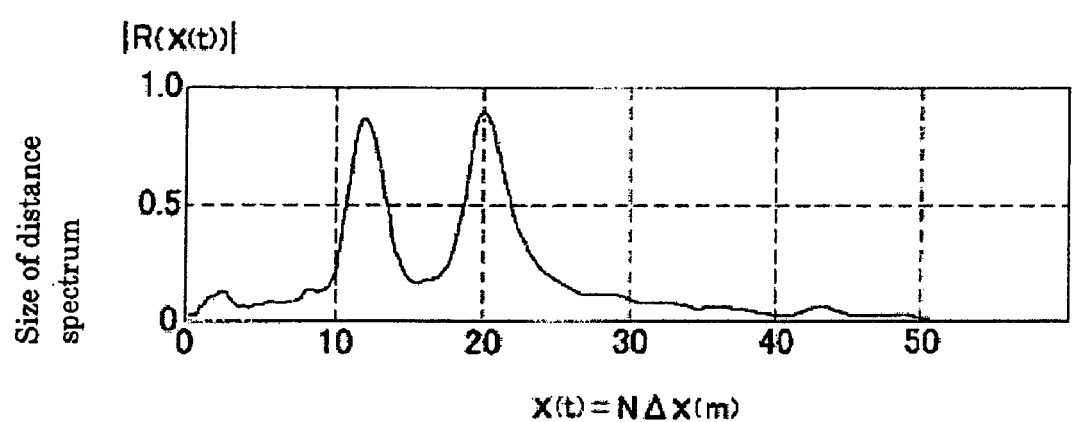

[Fig.23]
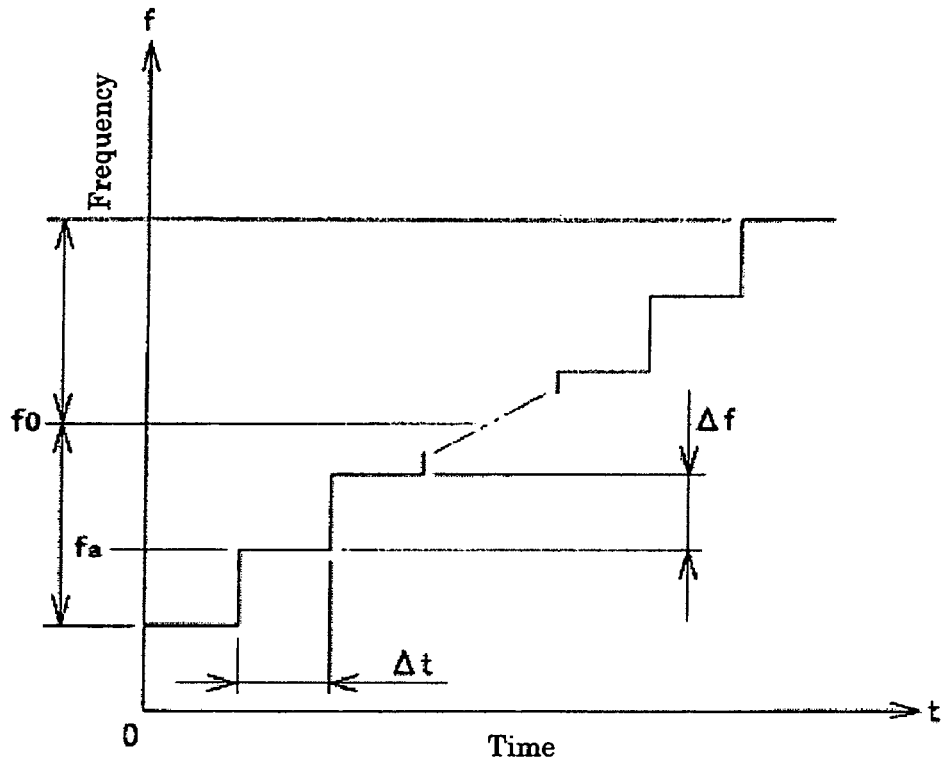
[Fig.24]
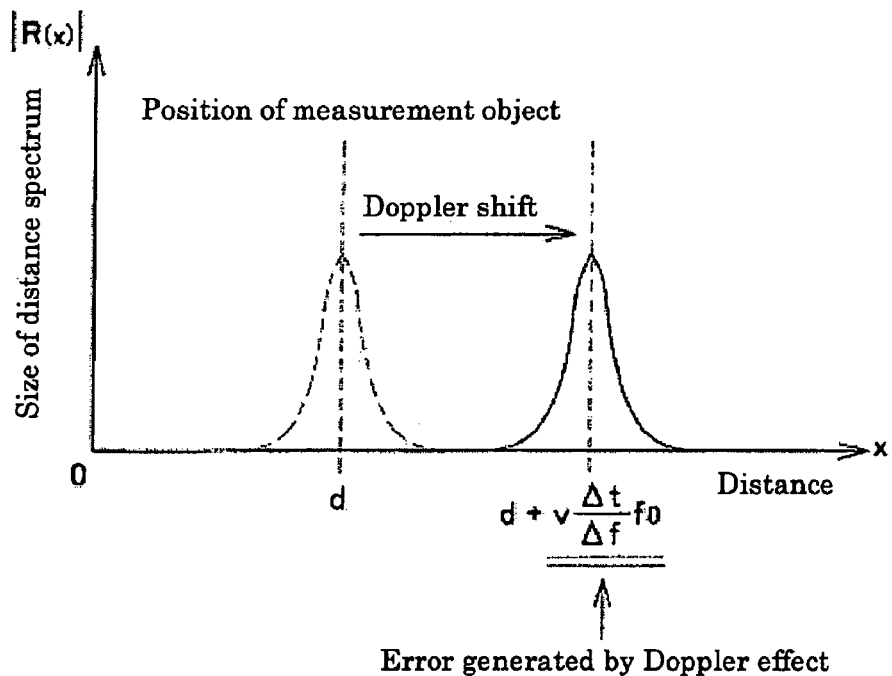

DISTANCE MEASURING DEVICE AND DISTANCE MEASURING METHOD

TECHNICAL FIELD

The present invention relates to a distance measuring device and distance measuring method, and more particularly, to a distance measuring device and distance measuring method which detects mixed wave of a progressive wave outputted from a signal source and a reflected wave of the progressive wave reflected by a measurement object, and measures distance to the measurement object.

BACKGROUND ART

Conventionally, as a distance measuring device by the use of electric wave, a pulse radar, an FMCW radar, and other radars are known.

The pulse radar transmits a pulse signal, measures the time in which the pulse signal is reflected by a measurement object, and finds the distance to the measurement object. In addition, the FMCW radar transmits a frequency-swept continuous wave and measures distance to a measurement object from the frequency difference between the transmitted signals and reflected signals. In addition to this, there are spread spectrum radar, coded pulse radar, and others, but these radars measure distance on the basis of round-trip time of signals to a measurement object as is the case of pulse radar.

At the same time, the foregoing radars basically measure round-trip time of signals to a measurement object, and resolution within several tens of meters lacks; therefore, it is difficult to measure the close range within several tens of meters. Furthermore, because the FMCW radar measures distance to the measurement object from the frequency difference between transmitted signals and reflected signals, it has problems of a need of the linearity of frequency change of transmitted signals as well as of a "False Object" which is caused by transmitted signals that leak to the receiving side; it also need accurately output transmitted signals so as to satisfy the linearity of frequency changes, separate antennas on the transmitting and receiving sides so that transmitted signals do not leak into the receiving side to prevent an occurrence of "False Object", and others, and it has been difficult to achieve a simple construction.

Therefore, there is a distance measuring device, as shown in FIG. 23, which bases on a concept in that a standing wave is generated if there is reflection (reflected wave) from a measurement object when an electromagnetic wave which has only one frequency component is transmitted to the measurement object as a progressive wave from an electromagnetic wave generating source; the device transmits an electromagnetic wave which has only one frequency component to a measurement object while changing over the frequency stepwise, detects a standing wave generated by interference between this transmitted wave and a reflected wave reflected by the measurement object, and finds distance between the detection point and the measurement object on the basis of the result of computing a variable period of amplitudes of this standing wave (see Patent Document 1).

The distance measuring device set forth in patent document 1 detects a standing wave generated by an interference between a progressive wave which has only one frequency component and a reflected wave produced by the progressive wave that reflects against the measurement object; therefore, the distance measuring device does not need to have a transmitted signal prevented from leaking into the receiving side as is the case of the FMCW radar, etc., and a simple construction can be achieved. Furthermore, as compared to a pulse radar, FMCW radar, and other radars, the distance measuring device set forth in patent document 1 is able to measure accurately even in near distance measurement.

The distance measuring device set forth in patent document 1, however, is effective when travel speed between the measurement object and the travel distance measuring device is comparatively slow and the travel distance within the measurement time can be ignored but when the travel speed between the measurement object and the distance measuring device is fast and the travel distance within the measurement time is unable to be ignored, the distance measuring device is difficult to obtain correct measured value due to the Doppler effect.

For measuring a distance accurately to a moving measurement object, there are distance measuring devices which increase and decrease the frequency of a signal which has only one frequency component in accordance with predetermined step frequencies, transmit this as a progressive wave, detect the amplitude of a standing wave generated by the interference between this progressive wave and a reflected wave produced by the progressive wave that reflects against a measurement object, compute signals which correspond to the detected amplitude, and find the distance between the detection point and the measurement object (for example, see patent document 2 and non-patent document 1).

The distance measuring devices set forth in patent document 2 and non-patent document 1 can compute signals which correspond to the amplitude of a standing wave generated by the interference between a progressive wave whose frequency is increased and decreased in accordance with predetermined step frequencies and the reflected wave, and simultaneously measure the distance between the detection point and the measurement object as well as the relative speed of the measurement object. In addition, as is the case of the distance measuring device set forth in patent document 1, the distance between the detection point and the measurement object is found by the use of the standing wave, and a simple construction is able to be achieved as a distance measuring device.

Patent document 1: Japanese Unexamined Patent Application Publication No. 2002-357656

Patent document 2: Japanese Unexamined Patent Application Publication No. 2004-325085

Non-patent document 1: "Short-Range High-Resolution Radar Utilizing Standing Wave for Measuring of Distance and Velocity of a Moving Target," FUJIMORI Shingo, UEBO Tetsuji, and IRITANI Tadamitsu, IEICE Transactions, vol. J87-B, No. 3, pp. 437-445, March 2004.

DISCLOSURE OF THE INVENTION

Technical Problems to be Solved

In the distance measuring devices set forth in patent document 2 and non-patent document 1, when a measurement object is one, both distance to the measurement object and relative speed were able to be measured with high accuracy; however, in the event that the measurement objects are multiple, distance between measurement objects is close, and the speed difference is large, the distance to each measurement object is unable to be determined uniquely and erroneous measurement results are sometimes obtained.

In addition, in the distance measuring device using a standing wave set forth in the above-mentioned patent documents 1 and 2 as well as non-patent document 1, signals outputted from signal sources have the frequency changed over stepwise so that signals (undulations) of frequency $f_a$ in a particular bandwidth are outputted for a period of $\Delta t$, as shown in FIG. 23, and thereafter, signals of frequency $f_a+\Delta f$ are outputted for a period of $\Delta t$. A signal outputted from a signal source is transmitted from a transmitter of antenna, etc., is reflected by a measurement object, and returns (reaches) to the detection point as a reflected wave. In such event, a progressive wave of frequency $f_a$ and a reflected wave that corresponds to the progressive wave of the frequency $f_a$ interfere (are superimposed) at the detection point; then, a standing wave is generated. That is, no standing wave is generated from when the progressive wave of frequency $f_a$ is outputted to the point when the reflected wave that corresponds to this frequency $f_a$ reaches the detection point, and to generate the standing wave, time is necessary from when the progressive wave of frequency $f_a$ is outputted until the progressive wave of this frequency is reflected by the measurement object and the reflected wave reaches the detection point.

Consequently, the time interval $\Delta t$ for changing over the frequency is unable to be made shorter than the time from when the frequency is changed until when a standing wave is generated. The distance measuring device using a standing wave, therefore, computes the distance spectrum from the relationship between the obtained signal level and the frequency and obtains the distance to the measurement object, but when the measurement object moves at the relative speed v, the peak of the distance spectrum deviate due to the Doppler effect, and as shown in FIG. 24, a measurement error of $v \cdot \Delta t / \Delta f \cdot f_0$ is generated.

In view of these problems, it is the object of the claimed invention to provide a distance measuring device and distance measuring method, which has features of "simple construction," "capability for measuring short distance," and "small measurement errors" with similar to a distance measuring device using a standing wave, and at the same time, which is practically free of influence exerted by the Doppler effect.

Means to Solve the Problems

A first aspect in accordance with the present invention provides a distance measuring device that includes a signal source for outputting a signal having a plurality of different frequency components within a particular bandwidth, a transmission unit for transmitting the signal as an undulation, a mixed wave detection unit for detecting a mixed wave of a progressive wave including either the undulation transmitted from the transmission unit or the signal outputted from the signal source and a reflected wave of the undulation transmitted from the transmission unit being reflected by the measurement object, a frequency component analysis unit for analyzing the frequency component of the mixed wave detected by the mixed wave detection unit, and a distance calculation unit for finding a distance spectrum by subjecting the analyzed data by the frequency component analysis unit further to spectrum analysis and thereby calculating the distance to the measurement object.

A distance measuring method related to the present invention transmits a signal having a plurality of different frequency components within a particular bandwidth as an undulation, detects a mixed wave of a progressive wave including either the undulation transmitted or the signal and a reflected wave of the undulation transmitted being reflected by the measurement object, analyzes the frequency component of the mixed wave detected, finds a distance spectrum by subjecting the analyzed data with frequency component analysis further to spectrum analysis, and thereby calculates the distance to the measurement object.

Consequently, because a mixed wave of a progressive wave and a reflected wave is detected and based on the mixed wave, the distance to the measurement object is calculated, there is no need to separate the progressive wave (transmitted signal) and the reflected wave (received signal), and a distance measuring device with a simple and easy-to-use construction can be achieved. In addition, in a distance measuring device using a standing wave, no standing wave is generated after the frequency is changed over and until the reflected wave that corresponds to the frequency returns to the detection point, and in addition, the frequency must be changed over in a multistage manner, and therefore, distance measurement is, in principle, unable to be performed at a high speed but the claimed invention which does not use any standing wave has no concept of changing over the frequency, and consequently, there exists, in principle, no time required for changing over the frequency, and as compared to the distance measuring device using a standing wave, the distance measuring device according to the present invention achieves high-speed distance measurement.

The signal source may include a plurality of single frequency oscillators, each of which oscillates a different single frequency component and an adder which synthesizes signals oscillated from the plurality of single frequency oscillators.

In addition, the signal source may include a single frequency oscillator that oscillates a single frequency component and a modulator that modulates a signal oscillated from the single frequency oscillator.

In addition, the signal source may include a noise source that outputs a frequency component within the particular bandwidth.

The frequency component analysis unit may include an AD converter that converts the mixed wave detected by the mixed wave detection unit to a digital signal and a signal processor that analyzes frequency components of the output data from the AD converter and calculates the size of each frequency component.

In addition, the frequency component analysis unit may include a plurality of band pass filters and a level detection unit that detects the output level of the band pass filters.

The distance calculation unit may calculate the distance spectrum by subjecting the analyzed data by the frequency component analysis unit to Fourier analysis.

A plurality of the mixed wave detection units may be arranged in different positions, the frequency component analysis unit may analyze frequency components for each mixed wave detected by the mixed wave detection units, and the distance calculation unit may calculate a distance spectrum by the use of the frequency component analyzed data of the plurality of mixed waves obtained.

A second aspect in accordance with the claimed invention provides a distance measuring device that includes a signal source that outputs a frequency modulated signal obtained by frequency-modulating a carrier wave of a specific frequency by an arbitrary frequency signal, a transmission unit that transmits the frequency modulated signal as an undulation, a mixed wave detection unit that detects a mixed wave of a progressive wave including either the undulation transmitted from the transmission unit or the frequency-modulated signal outputted from the signal source and a reflected wave of the undulation transmitted from the transmission unit being reflected by the measurement object, an amplitude component detection unit that detects an amplitude component of the mixed wave detected by the mixed wave detection unit, and a distance calculation unit that finds a distance spectrum by subjecting the amplitude component detected by the amplitude component detection unit further to spectrum analysis and thereby calculating the distance to the measurement object.

The distance measuring method related to the claimed invention transmits a signal obtained by frequency-modulating a carrier wave of a specific frequency by an arbitrary frequency signal as an undulation, detects a mixed wave of a progressive wave including either the undulation transmitted or the frequency-modulated signal and a reflected wave of the undulation transmitted being reflected by the measurement object, analyzes the amplitude component of the mixed wave detected, finds a distance spectrum by subjecting the amplitude component further to spectrum analysis, and thereby calculates the distance to the measurement object.

Consequently, because a mixed wave of a progressive wave and a reflected wave is detected and based on the mixed wave, the distance to the measurement object is calculated, there is no need to separate the antenna on the transmitting and receiving side to prevent the progressive wave (transmitted signal) from leaking into the receiving side, and a distance measuring device with a simple and easy-to-use construction can be achieved. In addition, in a distance measuring device using a standing wave, no standing wave is generated after the frequency is changed over and until the reflected wave that corresponds to the frequency returns to the detection point, and in addition, the frequency must be changed over in a multistage manner, and therefore, distance measurement is, in principle, unable to be performed at a high speed but the claimed invention which does not use any standing wave has no concept of changing over the frequency, and consequently, there exists, in principle, no time required for changing over the frequency, and as compared to the distance measuring device using a standing wave, the distance measuring device according to the present invention achieves high-speed distance measurement.

The distance calculation unit may calculate the distance spectrum by subjecting the amplitude component detected by the amplitude component detection unit to Fourier analysis.

A plurality of the mixed wave detection units may be arranged in different positions, the amplitude component detection unit may detect amplitude components for each mixed wave detected by the mixed wave detection units, the distance calculation unit may calculate a distance spectrum by the use of the amplitude component analyzed data of the plurality of mixed waves obtained.

A third aspect in accordance with the claimed invention provides a distance measuring device that includes a signal source that outputs a double modulated signal obtained by double-frequency-modulating a carrier wave of a specific frequency by a second modulated signal frequency-modulated in advance by the first modulated signal, a transmission unit that transmits the double-modulated signal as an undulation, a mixed wave detection unit that detects a mixed wave of a progressive wave including either the undulation transmitted from the transmission unit or the double-modulated signal outputted from the signal source and a reflected wave of the undulation transmitted from the transmission unit being reflected by the measurement object, an amplitude component detection unit that detects an amplitude component of the mixed wave detected by the mixed wave detection unit, a single frequency selection unit that selects a specific one frequency component from amplitude components detected by the amplitude component detection unit, a signal level detection unit that detects the level of a signal obtained by the single-frequency selection unit, and a distance calculation unit that calculates the distance to the measurement object from the signal level obtained by the signal level detection unit.

The distance measuring method related to the claimed invention transmits a double-modulated signal obtained by double-frequency-modulating a carrier wave of a specific frequency by a second modulated signal frequency-modulated in advance by a first modulated signal as an undulation, detects a mixed wave of a progressive wave including either the undulation transmitted or the double-frequency-modulated signal and a reflected wave of the undulation transmitted from the transmission unit being reflected by the measurement object, detects an amplitude component of the mixed wave detected, selects one specific frequency component from the amplitude components, detects the level of a signal of the selected frequency component, and calculates the distance from the signal level to the measurement object.

Consequently, because a mixed wave of a progressive wave and a reflected wave is detected and based on the mixed wave, the distance to the measurement object is calculated, there is no need to separate the progressive wave (transmitted signal) and the reflected wave (received signal), and a distance measuring device with a simple and easy-to-use construction can be achieved. In addition, in a distance measuring device using a standing wave, no standing wave is generated after the frequency is changed over and until the reflected wave that corresponds to the frequency returns to the detection point, and in addition, the frequency must be changed over in a multistage manner, and therefore, distance measurement is, in principle, unable to be performed at a high speed but the claimed invention which does not use any standing wave has no concept of changing over the frequency, and consequently, there exists, in principle, no time required for changing over the frequency, and as compared to the distance measuring device using a standing wave, the distance measuring device according to the present invention achieves high-speed distance measurement.

The signal source may generate the first modulated signal that generates the first modulated signal, the second modulated signal modulated by the first modulated signal, and the carrier wave, respectively.

In addition, the signal source may have a second modulated signal storage means that stores in advance the second modulated signal.

Or the signal source may have a second modulated signal storage means that stores in advance the second modulated signal and a carrier wave generating means that generates the carrier wave.

The first modulated signal may be a signal that draws a waveform that increases or decreases stepwise in a specific first cycle and the second modulated signal may be a signal obtained by modulating a saw-tooth wave of a cycle shorter than the first cycle modulated by the first modulated signal.

Effect of the Invention

The distance measuring device and distance measuring method according to the claimed invention formed as above detect a mixed wave of a progressive wave and a reflected wave reflected by a measurement object; there is no need to prevent the progressive wave from leaking into a receiving antenna, a simple construction can be achieved, and a distance measuring device of low cost and a small size can be obtained.

In addition, by finding a distance spectrum from a mixed wave of a progressive wave having a plurality of different frequency components and its reflected wave, the distance between the measurement object and the mixed wave detection unit can be found from the distance whose spectrum becomes the peak of the size.

When the distance to the measurement object is measured by the use of a standing wave, it is, in principle, unable to make the frequency change-over time shorter than the time required for forming a standing wave from when the progressive wave frequency is changed over, and the measurement is therefore subject to the influence of the Doppler effect and a measurement error is generated, but in the claimed invention, there is, in principle, no concept of changing over the frequency, the observation time is able to be shortened to such a level that the influence of the Doppler effect can be virtually ignored, and the correct distance is able to be measured irrespective of the travel speed and travel direction of the measurement object.

In addition, even when the distances of a plurality of measurement objects come closer and the speed differences are large, which are difficult to measure by a distance measuring device using a standing wave, the position of each measurement object can be correctly measured.

In addition, a plurality of mixed wave detection units are installed to different positions, respectively and the distance spectrum is found from a plurality of mixed waves detected by a plurality of mixed wave detection unit; therefore, distance measurement with still higher reliability and higher accuracy can be conducted.

In addition, when a double-modulated signal is outputted from a signal source, there is no need to use a high-cost microprocessor, etc. which can carry out spectrum analyses at high speed, and a signal processor is configured by an envelop detector, square-law detector, synchronous detector, quadrature detector, band pass filter, matched filter, and other devices, and detects the size of distance spectrum (signal level), and therefore, a signal processor of a processing speed nearly same as that of the signal processor using a microprocessor, etc. can be obtained at low cost. That is, a distance measuring device at low cost and fast signal processing speed can be obtained.

BRIEF DESCRIPTION OF DRAWINGS

FIG. 1 is a block diagram that explains the outline of a distance measuring device of the first embodiment;

FIG. 2 is an illustration of the distance measuring device that carries out simulations in the first embodiment;

FIG. 3 is a graph that shows the distance measurement simulation results of a measurement object at a distance of 10 meters and at a speed of 0 km per hour in the first embodiment;

FIG. 4 is a graph that shows distance measurement simulation results of a measurement object at a distance of 10 meters and at a speed of +300 km per hour in the first embodiment;

FIG. 5 is a graph that shows distance measurement simulation results of a measurement object at a distance of 40 meters and at a speed of −50 km per hour in the first embodiment;

FIG. 6 is a graph that shows distance measurement simulation results of measurements object at a distance of 5 meters and at a speed of +100 km per hour and at a distance of 12.5 m and at a speed of −300 km in the first embodiment;

FIG. 7 is an illustration of a distance measuring device equipped with a plurality of mixed wave detection units in the first embodiment;

FIG. 8 is a block diagram that explains the outline of a distance measuring device according to the second embodiment;

FIG. 9 is an illustration of a distance measuring device that carries out simulations in the second embodiment;

FIG. 10 is a graph that shows the distance measurement simulation results of a measurement object at a distance of 10 meters and at a speed of 0 km per hour in the second embodiment;

FIG. 11 is a graph that shows distance measurement simulation results of a measurement object at a distance of 10 meters and at a speed of +300 km per hour in the second embodiment;

FIG. 12 is a graph that shows distance measurement simulation results of a measurement object at a distance of 40 meters and at a speed of −50 km per hour in the second embodiment;

FIG. 13 is a graph that shows distance measurement simulation results of measurement objects at a distance of 5 meters and at a speed of +100 km per hour and at a distance of 12.5 m and at a speed of −300 km in the second embodiment;

FIG. 14 is an illustration of a distance measuring device equipped with a plurality of mixed wave detection units in the second embodiment;

FIG. 15 is a block diagram that explains the outline of a distance measuring device according to the third embodiment;

FIG. 16 is a block diagram that explains another example of a signal source in the third embodiment;

FIG. 17 is a graph that explains a waveform of a second modulating signal;

FIG. 18 is a graph that explains a waveform of a first modulating signal;

FIG. 19 is an illustration of a distance measuring device using a quadrature detector in the third embodiment;

FIG. 20 is a graph that shows distance measurement simulation results of measurement objects at a distance of 12 meters and 20 meters in the distance measuring device using the quadrature detector in the third embodiment;

FIG. 21 is an illustration of the distance measuring device using band pass filters in the third embodiment;

FIG. 22 is a graph that shows distance measurement simulation results of measurement objects at a distance of 12 meters and 20 meters in the distance measuring device using band pass filters in the third embodiment;

FIG. 23 is an illustration with respect to the frequency of a signal source in a distance measuring device using a standing wave; and FIG. 24 is an illustration that explains influence of the Doppler effect in a distance measuring device using a standing wave.

BRIEF DESCRIPTION OF NUMERALS

1. Signal source
2. Transmission unit
3. Mixed wave detection unit
4. Frequency component analysis unit
5. Distance calculation unit
6. Measurement object
7. Signal processor
8. Down converter
8a. Local oscillator
8b. Mixer
9. Signal source
9a. Carrier wave signal source
9b. Modulating signal source 10. Amplitude component detection unit
11. Distance calculation unit
12. Signal processor
13. Signal source
13a. Carrier wave signal source
13b. Second modulating signal source
13c. First modulating signal source
13d. Second modulating signal generating means
13e. Second modulating signal storage means
13f. Double modulated signal generating means
13g. Double modulated signal storage means
14. Signal processor
15. Amplitude component detection unit
16. Single frequency selection unit
17. Signal level detection unit
18. Distance calculation unit
19. Signal processor
20. Envelope detector
21. Quadrature detector
22. Level detection unit
23. Distance calculation unit
24. Signal processor
25. Envelope detector for amplitude component detection
26. Band pass filter
27. Envelope detector for signal level detection
28. Distance calculation unit

BEST MODE FOR CARRYING OUT THE INVENTION

The distance measuring device and distance measuring method related to the claimed invention are, as shown in FIGS. 1, 8, and 15, to transmit signals outputted from signal sources 1, 9, and 13 from a transmission unit 2 as an undulation and detects as a mixed wave without separating a reflected wave $V_R$ of this undulation (progressive wave $V_T$) reflected by a measurement object 6 in a mixed wave detection unit 3.

The signal source in the claimed invention outputs a signal which has a plurality of different frequency components in a particular bandwidth, outputs a frequency modulated signal obtained by frequency-modulating a carrier wave of a specific frequency by an arbitrary cycle signal, or outputs a double-modulated signal obtained by double-frequency-modulating a carrier wave of a specific frequency by a second-modulating signal which has been frequency-modulated in advance by a first modulating signal. That is, signals outputted from the signal sources 1, 9, and 13 are signals constantly having a plurality of different frequency components.

In addition, a progressive wave in the claimed invention is an undulation which is the signals outputted from the signal sources 1, 9, and 13 which the transmission unit 2 transmits or signals outputted from the signal sources 1, 9, and 13. That is, the progressive wave in the claimed invention is an undulation or signal (signal wave) which constantly has a plurality of frequency components. In addition, a reflected wave related to the claimed invention is an undulation constantly having a plurality of frequency components and being reflected by the measurement object 6.

And a mixed wave in the claimed invention is an undulation obtained by mixing (synthesizing) the progressive wave and the reflected wave. That is, an undulation obtained by superimposing the progressive wave having a plurality of frequency components on the reflected wave having a plurality of frequency components is the mixed wave in the claimed invention, and it does not indicate an undulation in which a plurality of undulations (waves) having single frequency components are superimposed.

In the following embodiments, explanation is made with an electromagnetic wave mentioned as an example for an undulation, but undulations of light, sound wave, current, material wave that propagates inside material, and others are undulations in the claimed invention.

By the way, in a distance measuring device using a standing wave as set forth in the above-mentioned patent documents 1 and 2 and non-patent document 1, etc., signals outputted from signal sources are signals that change over a frequency having a single frequency component stepwise in terms of time as shown in FIG. 23, and are not signals that constantly have a plurality of different frequency components as is the case of the claimed invention. In addition, the amplitude of an undulation generated by interference between a progressive wave transmitted on the basis of a signal having this single frequency component and a reflected wave of the progressive wave having this single frequency component reflected by a measurement object has no temporal change and becomes different values depending on the position in a space. Specifically, the amplitude becomes a periodic function with respect to the position, and this is called standing wave.

In the interference between the progressive wave based on signals having a plurality of frequency components and the reflected wave as is the case of the claimed invention, the relationship between the position in the space and amplitude of the mixed wave temporally changes and produces a phenomenon different from the standing wave.

Consequently, the distance measuring device related to the claimed invention uses physical phenomena different from the distance measuring device using a standing wave, and differs in principle.

First Embodiment

A technical outline of the first embodiment of the distance measuring device and the distance measuring method related to the claimed invention will be described as follows.

(Technical Outline 1)

FIG. 1 is an illustration that explains the outline of a distance measuring device related to the claimed invention. The distance measuring device related to the claimed invention transmits a signal (progressive wave $V_T$) outputted from a signal source 1 as an undulation from a transmission unit 2 to a measurement object 6, detects a mixed wave $V_C$ of a reflected wave $V_{Rk}$ reflected by the kth measurement object 6 and the progressive wave $V_T$ at a mixed wave detection unit 3, analyzes a frequency component ($a(f, x_s)$) of the mixed wave at a frequency component analysis unit 4, calculates a distance spectrum $R(x)$ at a distance calculation unit 5, and measures the distance to the measurement object 6.

The signal source 1 outputs a signal having a plurality of different frequency components in a specific bandwidth, and constantly outputs a signal having two or more frequency components. As a specific example, the signal source 1 is configured by a plurality of single-frequency oscillators that oscillate signals of different single frequency components and an adder that synthesizes signals of single frequency component oscillated by the plurality of single frequency oscillators, and signals constantly having two or more frequency components are outputted from the signal source 1. In addition, the signal source 1 may be configured with a single frequency oscillator that oscillates a single frequency component and a modulator which applies a specified modulation such as frequency modulation, amplitude modulation, and others to a signal oscillated from this single-frequency oscillator, and signals having different frequency components in a specific bandwidth may be outputted. Furthermore, the signal source 1 may be configured with a noise source that outputs frequency components in a specific bandwidth. A noise source that outputs frequency components in a specific bandwidth, for example, can be achieved by the use of a band pass filter that passes signals of a specific bandwidth only among signals outputted from the noise source.

The transmission unit 2 is a bidirectional element such as an antenna (or an electrode), etc. which transmits a signal outputted from the signal source 1 as an undulation. In the event that the mixed wave detection unit 3 is disposed between the signal source 1 and the transmission unit 2, the transmission unit 2 may undertake a role of receiving a reflected wave. The transmission unit 2 outputs an undulation of a frequency component outputted from the signal source 1 and the outputted undulation is transmitted to the measurement object 6.

By the way, the progressive wave $V_T$ in the claimed invention indicates an undulation transmitted from the transmission unit 2 and a signal outputted from the signal source 1.

Consequently, in the event that a mixed wave of a signal from the signal source 1 and a signal of a reflected wave returned via the transmission unit 2 is detected by the mixed wave detection unit 3, the signal from the signal source 1 becomes the progressive wave $V_T$.

The mixed wave detection unit 3 detects the mixed wave $V_C$ of the progressive wave $V_T$ and the reflected wave $V_{Rk}$. This mixed wave detection unit 3 may be configured by installing a coupler with no directionality to detect the mixed wave $V_C$ of the progressive wave $V_T$ outputted from the signal source 1 and the reflected wave $V_{Rk}$ returned via the transmission unit 2 in the midway of a power feeder that connects the signal source 1 to the transmission unit 2. In addition, a reception antenna (or an electrode) for detecting the mixed wave $V_C$ of the progressive wave $V_T$ and the reflected wave $V_{Rk}$ is installed in a space between the transmission unit 2 and the measurement object 6 and is designated as the mixed wave detection unit 3.

The frequency component analysis unit 4 analyzes the frequency component of the mixed wave $V_C$ detected by the mixed wave detection unit 3. It is also possible to configure the frequency component analysis unit 4 by a plurality of band pass filters and a level detection unit that detects the output level from the band pass filters and to analyze the size of each frequency component.

In addition, the frequency component analysis unit 4 may be configured by an AD converter that converts the mixed wave detected by the mixed wave detection unit 3 to a digital signal, and a signal processor that incorporates software to subject a digital signal of the mixed wave outputted from the AD converter to frequency component analysis such as Fourier transform, etc. and to calculate the size (absolute value) $a(f, x_s)$ of each frequency component.

By the way, the mixed wave detected by the mixed wave detection unit 3 may be outputted directly to the AD converter but a down converter 8 (see FIG. 2) may be installed between the mixed wave detection unit 3 and the AD converter, and the frequency may be inputted into the AD converter after lowering the frequency. For the down converter 8, a known down converter suffices, and for example, the down converter may be configured with a local oscillator 8a that oscillates a frequency you want to down-convert and a mixer (frequency converter) 8b that mixes the mixed wave $V_C$ detected by the mixed wave detection unit 3 and a periodical signal from the local oscillator 8a to down-covert to a desired frequency.

The distance calculation unit 5 subjects the data analyzed by the frequency component analysis unit 4 to spectrum analysis to find the distance spectrum, calculates the size of this distance spectrum, and calculates the distance to the measurement object 6 on the basis of the size peak of the distance spectrum. For the method of spectrum analysis, the spectrum is analyzed by a nonparametric technique represented by Fourier transform, or a parametric technique such as AR modeling, or other appropriate spectrum analysis technique.

(Measuring Principle 1)

Referring now to FIG. 1 and FIG. 2, the measuring principle will be described for the distance measuring device and the distance measuring method related to the claimed invention as follows.

When the progressive wave outputted from the signal source 1 has a frequency component of a bandwidth of $f_0-f_w/2$ to $f_0+f_w/2$ and the amplitude for each frequency component is $A(f)$ and the phase is $\theta(f)$, the progressive wave $V_T$ at the elapsed time t and at the position x from the start of measurement can be expressed by the following Eq. (1):

[Eq. 1]

$$V_T(t, x) = \int_{f_0-\frac{f_W}{2}}^{f_0+\frac{f_W}{2}} A(f) \cdot e^{j\theta(f)} \cdot e^{j2\pi f\left(t-\frac{x}{c}\right)} df \quad \text{Eq. (1)}$$

where, f denotes the frequency and c denotes the velocity of light, and any one point on the x-axis is x=0.

Let $d_k$ denote the distance of the kth measurement object 6, $v_k$ the velocity of light, and $Y_k$ and $\phi_k$ the size and the phase of the reflection coefficient, respectively; then, the reflected wave $V_{Rk}$ from the measurement object 6 can be expressed by the following Eq. (2), where, k=1, 2, . . . :

[Eq. 2]

$$V_{Rk}(t, x) = \int_{f_0-\frac{f_W}{2}}^{f_0+\frac{f_W}{2}} A(f) \cdot \gamma_k e^{j(\phi_k+\theta(f))} \cdot e^{j2\pi f\left(t-\frac{2(d_k+v_k t)-x}{c}\right)} df \quad \text{Eq. (2)}$$

In such event, the signal $V_C$ of the mixed wave observed at the mixed wave detection unit 3 located at the position of $x=x_s$ is expressed by the following Eq. (3):

[Eq. 3]

$$V_C(t, x_s) = V_T(t, x_s) + \sum_{k=1}^{n} V_{Rk}(t, x_s) \quad \text{Eq. (3)}$$

$$= \int_{f_0-\frac{f_W}{2}}^{f_0+\frac{f_W}{2}} A(f) \cdot e^{j\theta(f)}$$

$$\left\{ e^{j2\pi f\left(t-\frac{x_s}{c}\right)} + \sum_{k=1}^{n} \gamma_k e^{j\phi_k} \cdot e^{j2\pi f\left(t-\frac{2(d_k+v_k t)-x_s}{c}\right)} \right\}$$

$$df$$

$$= \int_{f_0-\frac{f_W}{2}}^{f_0+\frac{f_W}{2}} A(f) \cdot e^{j\theta(f)} \cdot e^{j2\pi f\left(t-\frac{x_s}{c}\right)}$$

$$\left\{ 1 + \sum_{k=1}^{n} \gamma_k e^{j\phi_k} \cdot e^{-j\frac{4\pi f}{c}(d_k+v_k t-x_s)} \right\} df$$

The mixed wave $V_C$ detected by the mixed wave detection unit 3 is decomposed into each frequency component through a band pass filter. Or as shown in FIG. 2, the mixed wave $V_C$ is converted into a digital signal by an AD converter (S100) and this digital signal is decomposed into each frequency component by the frequency component analysis such as Fourier transform (S101).

The decomposed component $V_C(f, t, x_s)$ of frequency f is the integrand (equation to be integrated) in Eq. (3) and is expressed by the following Eq. (4):

[Eq. 4]

$$V_C(f, t, x_s) = \qquad \text{Eq. (4)}$$
$$A(f) \cdot e^{j\theta(f)} \cdot e^{j2\pi f\left(t-\frac{x_s}{c}\right)} \left\{ 1 + \sum_{k=1}^{n} \gamma_k e^{j\phi_k} \cdot e^{-j\frac{4\pi f}{c}(d_k + v_k t - x_s)} \right\}$$

The amplitude of the decomposed component of frequency f can be expressed by the following Eq. (5).

[Eq. 5]

$$|V_C(f, t, x_s)| \approx A(f) \left\{ 1 + \sum_{k=1}^{n} \gamma_k \cos\left(\frac{4\pi f(d_k + v_k t - x_s)}{c} - \phi_k\right) \right\} \quad \text{Eq. (5)}$$

where, realistically, the size of the reflected wave can be assumed extremely small, and therefore it is approximated as $Y_k \ll 1$.

Now, if by making t sufficiently small, $v_k t \equiv 0$ could be regarded (as is the case of a simulation later discussed, even when observation time t=3.5 [μsec] and velocity $v_k$=300 [km/h], $v_k$t=0.29 [mm], and $v_k$t≡0 could be regarded), and the amplitude of the decomposed component of frequency f can be approximated like the following Eq. (6):

[Eq. 6]

$$|V_C(f, t, x_s)| \approx A(f) \left\{ 1 + \sum_{k=1}^{n} \gamma_k \cos\left(\frac{4\pi f(d_k - x_s)}{c} - \phi_k\right) \right\} \quad \text{Eq. (6)}$$

Now, A(f) denotes the frequency characteristics of the signal source 1 and is able to be easily known, and therefore, is able to be considered known. In the event that A(f) is able to be regarded as constant A, we have

[Eq. 7]

$$a(f, x_s) = |V_C(f, t, x_s)| \qquad \text{Eq. (7)}$$
$$\approx A \left\{ 1 + \sum_{k=1}^{n} \gamma_k \cos\left(\frac{4\pi f(d_k - x_s)}{c} - \phi_k\right) \right\}.$$

Or in the event that A(f) is not a constant (for example, in the event that a noise source is used), normalizing Eq. (6) by A(f) gives

[Eq. 8]

$$a(f, x_s) = |V_C(f, t, x_s)|/A(f) \qquad \text{Eq. (8)}$$
$$\approx 1 + \sum_{k=1}^{n} \gamma_k \cos\left(\frac{4\pi f(d_k - x_s)}{c} - \phi_k\right).$$

The value of constant A of the above-mentioned Eq. (7) has no information on the distance. Therefore, if A=1, Eq. (7) becomes the same as Eq. (8), and Eq. (8) is used as an equation that expresses the amplitude hereinafter.

We find that Eq. (8) is a periodic function which has a cycle of $c/2(d_k-x_s)$ for the frequency f. Consequently, if this is subject to spectrum analysis by a nonparametric technique represented by, for example, the Fourier transform or a parametric technique such as AR modeling, etc., the distance $d_k-x_s$ from the mixed wave detection unit 3 to the measurement object can be obtained.

An example of calculating the distance by the Fourier transform is shown as follows.

In the Fourier transform formula

[Eq. 9]

$$\int_{-\infty}^{+\infty} f(t)e^{-j\omega t} dt, \qquad \text{Eq. (9)}$$

the substitutions $\omega/2\tau \rightarrow 2x/c$, $t \rightarrow f$, and $f(t) \rightarrow a(f, x_s)$ are made. As a result, the distance spectrum R(x) can be found as follows (S103 (see FIG. 2)).

[Eq. 10]

$$R(x) = \int_{f_0 - \frac{f_W}{2}}^{f_0 + \frac{f_W}{2}} a(f, x_s) e^{-j\frac{4\pi f x}{c}} df \qquad \text{Eq. (10)}$$
$$= f_W \cdot e^{-j\frac{4\pi f_0 x}{c}}$$
$$\left\{ S_a\left(\frac{2\pi f_W}{c} x\right) + \frac{1}{2} \sum_{k=1}^{n} \gamma_k e^{-j\phi_k} \cdot e^{j\frac{4\pi f_0(d_k - x_s)}{c}} \right.$$
$$S_a\left(\frac{2\pi f_W}{c}(x - d_k + x_s)\right) +$$
$$\frac{1}{2} \sum_{k=1}^{n} \gamma_k e^{j\phi_k} \cdot e^{-j\frac{4\pi f_0(d_k - x_s)}{c}}$$
$$\left. S_a\left(\frac{2\pi f_W}{c}(x + d_k - x_s)\right) \right\}$$

where, $S_a(z) = \sin(z)/z$.

According to Eq. (10), the size of R(x) (intensity of distance spectrum) |R(x)| becomes a peak at x=0, $\pm(d_k-x_s)$. Realistically, limit to x>0 because the distance $d_k-x_s$ from the mixed wave detection unit 3 to the measurement object 6 is positive; then, the value of x when |R(x)| becomes a peak is the distance $d_k-x_s$ from the mixed wave detection unit 3 to the measurement object 6. That is, by finding x which makes the value of |R(x)| become a peak, we can find the position from the mixed wave detection unit 3 to the measurement object 6 (S104 (see FIG. 2)).

As described above, in the distance measuring device and the distance measuring method related to the claimed invention, a mixed wave of a progressed wave and a reflected wave reflected by a measurement object is detected; therefore, there is no need to separate the progressive wave and the reflected wave and a simple construction can be achieved, and a low-cost and a small distance measuring device can be obtained.

In addition, by finding a distance spectrum from a mixed wave of a progressive wave having a plurality of different frequency components and its reflected wave, we can find a distance between a measurement object and a mixed wave detection unit from the distance in which the distance spectrum size becomes the peak.

When the distance to a measurement object is measured by the use of a standing wave, it is, in principle, unable to make the observation time shorter than the time in which a standing wave is formed after the progressive wave frequency is changed over, the peak of the distance spectrum is subject to the Doppler effect and a measurement error is generated, but in the claimed invention, there is, in principle, no concept of changing over the frequency, and the observation time can be shortened to such a level that the Doppler effect is able to be virtually ignored, and an accurate distance can be measured.

(Simulation 1)

Next, based on the foregoing measurement principle 1, a simulation is carried out with a distance measuring device shown in FIG. 2.

The distance measuring device shown in FIG. 2 has a signal source 1 that outputs a signal uniformly including components of 24.000 GHz to 24.075 GHz and a transmission unit 2 that transmits a progressive wave $V_T$ uniformly including components of the bandwidth to measurement objects 6, . . . , 6. And the distance measuring device has a mixed wave detection unit 3 that detects a mixed wave $V_C$ (t, 0) of a reflected wave $V_{Rk}$ reflected by the kth measurement object 6 and the progressive wave $V_T$. By the way, the mixed wave detection unit 3 is located at $x_s=0$. The detected mixed wave $V_C$ is down-converted to 0 to 75 MHz by a down converter 8. The $V_C$ down-converted is converted into a digital signal by an AD converter (S100) and $V_C$(f, t, 0) converted into a digital signal is Fourier-transformed to decompose into each frequency component (S101). In order to find the amplitude of each frequency component, the absolute value of the mixed wave $V_C$(f, t, 0) decomposed into each frequency component is calculated (S102), and then, the normalized amplitude a(f, 0) is found. This normalized amplitude a(f, 0) is subject to spectrum analysis to find a distance spectrum R(x) (S103), and from the peak of the size (intensity) of the distance spectrum R(x), the position of the measurement object 6 is calculated (S104). By the way, let the direction in which the velocity of the measurement object 6 recedes from the distance measuring device be positive and the direction in which it comes closer to the distance measuring device be negative.

In the simulation of the distance measuring device shown in FIG. 2, the mixed wave of the progressive wave and the reflected wave is observed for 3.5 μsec (t=3.5 [μsec]).

In the simulation, the signal uniformly including components of 24.000 GHz to 24.075 GHz outputted from the signal source is designated as a progressive wave, and the mixed wave $V_C$(t, 0) is calculated in conformity to Eq. (3). Then, multiply the mixed wave $V_C$ by −24 GHz complex sine-wave and obtain the down-converted $V_C$. That is, the mixed wave $V_C$ is down-converted to 0 to 75 MHz.

Then, the down-converted $V_C$ is Fourier-transformed to find Eq. (8) (a(f, 0)) from the absolute value, and a(f, 0) is Fourier-transformed according to Eq. (10) to find the distance spectrum R(x) and the size of the distance spectrum (|R(x)|.

(Simulation 1-1)

FIG. 3 are graph that simulate the distance measurement when the measurement object 6 remains stationary at a distance of 10 meters from the mixed wave detection unit 3 and at the velocity per hour of 0 km. FIG. 3(a) shows the time waveform of the down-converted mixed wave (progressive wave+reflected wave) and is a graph that shows an instantaneous value at each time of the measurement period (graph of down-converted $V_C$(t, 0)). FIG. 3(b) is a graph of a(f,0) shown by Eq. (8), and shows the normalized amplitude of each frequency component. FIG. 3(c) is a graph that shows the relationship between the distance and the size of the distance spectrum |R(x)| by subjecting a(f, 0) found by FIG. 3(b) to spectrum analysis. As clear from FIG. 3(c), the size of the distance spectrum has a large peak value at a distance of 10 meters. Based on this, under the stationary state, a correct distance can be measured.

(Simulation 1-2)

FIG. 4 are graphs that simulate the distance measurement when the measurement object 6 moves from the mixed wave detection unit 3 at a distance of 10 meters and at a velocity per hour of +300 km. FIG. 4(a) is a time waveform of the down-converted mixed wave (progressive wave+reflected wave), and is a graph that shows an instantaneous value at each time of the measurement period (a graph of down-converted $V_C$ (t, 0)). FIG. 4(b) is a graph of a(f, 0) shown by Eq. (8) and indicates the normalized amplitude of each frequency component. FIG. 4(c) is a graph that shows the relationship between the distance and the size of the distance spectrum |R(x)| by subjecting a(f, 0) found by FIG. 4(b) to spectrum analysis. As clear from FIG. 4(c), the size of the distance spectrum has a large peak value at a distance of 10 meters. Based on this, even when the measurement object is moving at a velocity per hour of +300 km, a correct distance can be measured as is the case of simulation 1-1.

(Simulation 1-3)

FIG. 5 are graphs that simulate the distance measurement when the measurement object 6 moves from the mixed wave detection unit 3 at a distance of 40 meters and at a velocity per hour of −50 km. FIG. 5(a) is a time waveform of the down-converted mixed wave (progressive wave+reflected wave), and is a graph that shows an instantaneous value at each time of measurement period (a graph of down-converted $V_C$(t, 0)). FIG. 5(b) is a graph of a(f, 0) shown by Eq. (8) and indicates the normalized amplitude of each frequency component. FIG. 5(c) is a graph that shows the relationship between the distance and the size of the distance spectrum |R(x)| by subjecting a(f, 0) found by FIG. 5(b) to spectrum analysis. As clear from FIG. 5(c), the size of the distance spectrum has a large peak value at a distance of 40 meters. Based on this, even when the distance, travel speed, and travel direction to the measurement object are changed, a correct distance can be measured.

(Simulation 1-4)

FIG. 6 are graphs that simulate the distance measurement when there are two measurement objects 6 and one measurement object 6 moves from the mixed wave detection unit 3 at a distance of 5 meters and at a velocity per hour of +100 km, while the other measurement object 6 moves from the mixed wave detection unit 3 at a distance of 12.5 meters and at a velocity per hour of −300 km. FIG. 6(a) is a time waveform of the down-converted mixed wave (progressive wave+reflected wave), and is a graph that shows an instantaneous value at each time of measurement period (a graph of down-converted $V_C$(t, 0)). FIG. 6(b) is a graph of a(f, 0) shown by Eq. (8) and indicates the normalized amplitude of each frequency component. FIG. 6(c) is a graph that shows the relationship between the distance and the size of the distance spectrum |R(x)| by subjecting a(f, 0) found by FIG. 6(b) to spectrum analysis. As clear from FIG. 6(c), the size of the distance spectrum has large peak values at distances of 5 meters and 12.5 meters. Based on this, even when there are a plurality of measurement objects, correct distances can be measured. Even when the measurement object moves at a short distance of 10 meters or less, a correct distance can also be measured. Furthermore, even in the case that distances of a plurality of measurement objects come closer and the velocity difference is large, which is difficult to measure with a distance measuring device using a standing wave, the position of each measurement object is able to be correctly measured.

As clear from the foregoing simulations 1-1 through 1-4, regardless of the velocity of a measurement object, the distance of the measurement object is able to be measured. Furthermore, even when distances of a plurality of measurement objects come closer and the velocity difference is large, the position of each measurement object is able to be correctly measured.

In the foregoing description, a mixed wave is detected by one mixed wave detection unit 3, but as shown in FIG. 7, a plurality of mixed wave detection units 3, . . . , 3 may be disposed at different positions $x_{s1}, \ldots, x_{sN}$, which are different from one another. The mixed waves $V_C$ detected by a plurality of mixed wave detection units 3, . . . , 3 in this way are AD-converted by an AD converter for every mixed wave detection unit 3 (S110), signals of the mixed waves converted into digital signals are Fourier-transformed (S111), and the absolute value is calculated to find the amplitude a (f, $x_{si}$) (i denotes 1, 2, . . . , N, . . . ) for every mixed wave detection unit 3. By finding a difference between any two amplitudes (for example, a(f, $x_{s1}$) and a(f, $X_{s2}$)), an unrequired direct current component (first term of Eq. (8)) is eliminated (S113), and each amplitude a(f, $x_{si}$) with an unrequited direct current component removed is subject to spectrum analysis to find a distance spectrum (S114), and after averaging each distance spectrum (S115), the distance to the measurement object 6 is calculated on the basis of the peak of the distance spectrum size (S116). These can be achieved by equipping, for example, a direct current component eliminating means that finds a difference of any two amplitudes and eliminates an unnecessary direct current component and a distance spectrum averaging means that calculates the average of a plurality of distance spectra to the distance calculation unit 5.

Consequently, in the event that a plurality of mixed wave detection units 3 are installed to configure a signal processor as shown in FIG. 7, unrequired direct current components can be eliminated. In addition, the distance spectrums obtained from each amplitude a(f, $x_{si}$) are averaged, noise components are reduced, and the distance can be measured more accurately.

Second Embodiment

A technical outline of the second embodiment of the distance measuring device and the distance measuring method related to the claimed invention will be described as follows.
(Technical Outline 2)
FIG. 8 is an illustration that explains the outline of a distance measuring device related to the claimed invention. The distance measuring device related to the claimed invention transmits a signal outputted from a signal source 9 as an undulation from a transmission unit 2 to a measurement object 6, detects a mixed wave $V_C$ of a reflected wave $V_{Rk}$ reflected by the kth measurement object 6 and the progressive wave $V_T$ at a mixed wave detection unit 3, detects an amplitude component (a(t, $x_s$) of the mixed wave at an amplitude component detection unit 10, calculates a distance spectrum R(x) at a distance calculation unit 11, and measures the distance to the measurement object 6.

The signal source 9 outputs a frequency-modulated signal obtained by frequency-modulating a carrier wave of a specific frequency by an arbitrary periodical signal, and constantly outputs a signal having two or more frequency components. As a specific example, as shown in FIG. 9, the signal source 9 is configured by a carrier wave signal source 9a that transmits a carrier wave signal of a specific frequency and a modulating signal source 9b that modulates this carrier wave signal by an arbitrary periodical signal, and a frequency-modulated signal is outputted from this signal source 9. As another specific example, the signal source 9 may be configured with a frequency modulated signal generating means (not illustrated) equipped with a microprocessor and a frequency modulated signal storage means (not illustrated) that stores data for outputting a frequency modulated signal of instantaneous frequency $f_0+f_D \cdot m(t)$, and the data stored in the frequency modulated signal storage means is read by the frequency modulated signal generating means, and a frequency-modulated signal may be generated.

The transmission unit 2 is a bidirectional element such as an antenna (or an electrode), etc. which transmits a signal outputted from the signal source 9 as an undulation. In the event that the mixed wave detection unit 3 is disposed between the signal source 9 and the transmission unit 2, the transmission unit 2 may undertake a role of receiving a reflected wave. The transmission unit 2 outputs an undulation of a frequency component outputted from the signal source 9 and the outputted undulation is transmitted to the measurement object 6.

By the way, the progressive wave $V_T$ in the claimed invention indicates an undulation transmitted from the transmission unit 2 and a signal outputted from the signal source 9.

Consequently, in the event that a mixed wave of a signal from the signal source 9 and a signal of a reflected wave returned via the transmission unit 2 is detected by the mixed wave detection unit 3, the signal from the signal source 9 becomes the progressive wave $V_T$.

The mixed wave detection unit 3 detects the mixed wave $V_C$ of the progressive wave $V_T$ and the reflected wave $V_{Rk}$. This mixed wave detection unit 3 is able to be configured by installing a coupler with no directionality to detect the mixed wave $V_C$ of the progressive $V_T$ outputted from the signal source 9 and the reflective wave $V_{Rk}$ returned via the transmission unit 2 in the midway of a power feeder that connects the signal source 9 to the transmission unit 2. In addition, a reception antenna (or an electrode) for detecting the mixed wave $V_C$ of the progressive wave $V_T$ and the reflected wave $V_{Rk}$ is installed in a space between the transmission unit 2 and the measurement object 6 and is designated as the mixed wave detection unit 3.

The amplitude component detection unit 10 detects an amplitude component of the mixed wave $V_C$ detected by the mixed wave detection unit 3 and is configured by any of an envelope detector, square-law detector, synchronization detector, quadrature detector, and the like.

The distance calculation unit 11 subjects the amplitude component detected by the amplitude component detection unit 10 to spectrum analysis to find the distance spectrum, calculates the size of this distance spectrum, and calculates the distance to the measurement object 6 on the basis of the size peak of the distance spectrum. For the method of spectrum analysis, the spectrum is analyzed by a nonparametric technique represented by Fourier transform, or a parametric technique such as AR modeling, etc., or other appropriate spectrum analysis technique.

(Measuring Principle 2)

Referring now to FIG. 8 and FIG. 9, the measuring principle will be described for the distance measuring device and the distance measuring method related to the claimed invention as follows.

When the signal source 9 is configured by a carrier wave signal source 9a of frequency $f_0$ and a modulating signal source 9b that modulates a carrier wave of this carrier wave signal source 9a, the progressive wave $V_T$ at an elapsed time t from the start of measurement and at position x becomes a frequency-modulated continuous wave as expressed by the following Eq. (11):

[Eq. 11]

$$V_T(t, x) = A e^{j\theta} \cdot e^{j2\pi f_0 \left(t - \frac{x}{c}\right)} \cdot e^{j2\pi f_D \int m\left(t - \frac{x}{c}\right) dt} \quad \text{Eq. (11)}$$

where, t denotes the elapsed time from the start of measurement, and m(t) is a modulated signal, which is an arbitrary periodic function with an amplitude of 1. Let $f_D$ denote the maximum frequency shift of frequency modulation and $f_0$ denotes the center frequency. Consequently, the instantaneous frequency of the progressive wave $V_T(t, x)$ is $f_0 + f_D \cdot m(t)$. In addition, c denotes the velocity of light and θ the phase, and any one point on the x-axis is x=0.

Let $d_k$ denote the distance of the kth measurement object 6, $v_k$ the velocity, and $Y_k$ and $\phi_k$ the size and the phase of the reflection coefficient, respectively; then, the reflected wave from the measurement object 6 can be expressed by the following Eq. (12), where, k=1, 2, . . . :

[Eq. 12]

$$V_{Rk}(t, x) = \quad \text{Eq. (12)}$$
$$A\gamma_k e^{j\phi_k} \cdot e^{j\theta} \cdot e^{j2\pi f_0\left(t - \frac{2(d_k + v_k t) - x}{c}\right)} \cdot e^{j2\pi f_D \int m\left(t - \frac{2(d_k + v_k t) - x}{c}\right) dt}$$

In such event, the signal $V_C$ of the mixed wave observed at the mixed wave detection unit 3 located at the position of $x = x_s$ is expressed by the following Eq. (13):

[Eq. 13]

$$V_C(t, x_s) = V_T(t, x_s) + \sum_{k=1}^{n} V_{Rk}(t, x_s) = A e^{j\theta} \cdot e^{j2\pi f_0 \left(t - \frac{x_s}{c}\right)} \cdot \quad \text{Eq. (13)}$$
$$e^{j2\pi f_D \int m\left(t - \frac{x_s}{c}\right) dt} \cdot \left[ 1 + \sum_{k=1}^{n} \gamma_k e^{j\phi_k} e^{-j\frac{4\pi f_0}{c}(d_k - v_k t - x_s)} \cdot e^{j2\pi f_D \int \left[m\left(t - \frac{2(d_k + v_k t) - x_s}{c}\right) - m\left(t - \frac{x_s}{c}\right)\right] dt} \right]$$

And the amplitude of $V_C$ is expressed by the following Eq. (14).

[Eq. 14]

$$a(t, x_s) = |V_C(t, x_s)| \quad \text{Eq. (14)}$$
$$= A \cdot \left| 1 + \sum_{k=1}^{n} \gamma_k e^{j\phi_k} e^{-j\frac{4\pi f_0}{c}(d_k + v_k t - x_s)} \cdot e^{j2\pi f_D \int \left[m\left(t - \frac{2(d_k |v_k|) x_s}{c}\right) - m\left(t - \frac{x_s}{c}\right)\right] dt} \right|$$

Because, realistically, the size of the reflected wave can be assumed extremely small, $Y_k \ll 1$ and the term of second degree of $Y_k$ and higher are able to be ignored as nearly zero. Consequently, it can be approximated as the following Eq. (15):

[Eq. 15]

$$a(t, x_s) \approx \quad \text{Eq. (15)}$$
$$A \cdot \left[ 1 + \sum_{k=1}^{n} \gamma_k \cos \left\{ \phi_k - \frac{4\pi f_0}{c}(d_k + v_k t - x_s) + 2\pi f_D \int \left[ m\left(t - \frac{2(d_k + v_k t) - x_s}{c}\right) - m\left(t - \frac{x_s}{c}\right) \right] dt \right\} \right]$$

Now, if by making t sufficiently small, $v_k t \equiv 0$ could be regarded (as is the case of a simulation later discussed, even when observation time t=20 [μsec] and velocity $v_k t$=300 [km/h], $v_k t$=0.1.7 [mm], and $v_k t \equiv 0$ could be regarded), the amplitude of $V_C$ can be approximated like the following Eq. (16) and effect of the velocity $v_k$ can be eliminated:

[Eq. 16]

$$a(t, x_s) \approx A \cdot \left[ 1 + \sum_{k=1}^{n} \gamma_k \cos \left\{ \phi_k - \frac{4\pi f_0}{c}(d_k - x_s) + 2\pi f_D \int \left[ m\left(t - \frac{2 d_k - x_s}{c}\right) - m\left(t - \frac{x_s}{c}\right) \right] dt \right\} \right] \quad \text{Eq. (16)}$$

Furthermore, approximating as the following Eq. (17)

[Eq. 17]

$$\frac{m\left(t - \frac{2 d_k - x_s}{c}\right) - m\left(t - \frac{x_s}{c}\right)}{-2\frac{d_k - x_s}{c}} \approx \frac{d}{dt} m(t) \quad \text{(Eq. 17)}$$

Eq. (16) becomes the following Eq. (18).

[Eq. 18]

$$a(t, x_s) \approx 1 + \sum_{k=1}^{n} \gamma_k \cos \left\{ \frac{4\pi (f_0 + f_D \cdot m(t))}{c}(d_k - x_s) - \phi_k \right\} \quad \text{Eq. (18)}$$

where, A=1 because the constant A has no information in the claimed invention.

Now, we find that Eq. (18) is a periodic function which has a cycle of $c/2(d_k-x_s)$ for the instantaneous frequency $f_0+f_D\cdot m(t)$. Consequently, if this is subject to spectrum analysis by a nonparametric technique represented by, for example, the Fourier transform or a parametric technique such as AR modeling, etc., the distance $d_k-x_s$ from the mixed wave detection unit 3 to the measurement object 6 can be obtained.

An example of calculating the distance by the Fourier transform is shown as follows.

In the Fourier transform formula (9), the substitutions $f(t) \rightarrow a(f, x_s)$, $\omega/2\pi \rightarrow 2x/c$, and $t \rightarrow$ instantaneous frequency $f_0+f_D\cdot m(t)$ are made. Because $df=f_D\cdot dm(t)$, the distance spectrum $R(x)$ can be found as the following Eq. (19).

[Eq. 19]

$$R(x) = \int_{-1}^{1} a(t, x_s) e^{-j\frac{4\pi x}{c}f_0} \cdot e^{-j\frac{4\pi x}{c}f_D m(t)} \cdot f_D \cdot dm(t) = f_D \cdot e^{-j\frac{4\pi f_0 x}{c}}$$

$$\left\{ \begin{array}{l} 2Sa\left(\frac{4\pi f_D}{c}x\right) + \sum_{k=1}^{n} \gamma_k e^{-j\phi k} \cdot \\ e^{j\frac{4\pi f_0(d_k-x_s)}{c}} Sa\left(\frac{4\pi f_D}{c}(x - d_k + x_s)\right) \\ \sum_{k=1}^{n} \gamma_k e^{j\phi k} \cdot e^{-j\frac{4\pi f_0(d_k-x_s)}{c}} Sa\left(\frac{4\pi f_D}{c}(x | d_k - x_s)\right) \end{array} \right\},$$

where, $Sa(z) = \sin(z)/z$.

According to Eq. (19), the size of R(x) (intensity of distance spectrum) |R(x)| becomes a peak at x=0, $\pm(d_k-x_s)$. Realistically, limit to x>0 because the distance $d_k-x_s$ from the mixed wave detection unit 3 to the measurement object 6 is positive; then, the value of x when |R(x)| becomes a peak is the distance $d_k-x_s$ from the mixed wave detection unit 3 to the measurement object 6.

As described above, in the distance measuring device and the distance measuring method related to the claimed invention, a mixed wave of a progressed wave and a reflected wave reflected by a measurement object is detected; therefore, there is no need to separate the progressive wave and the reflected wave and a simple construction can be achieved, and a low-cost and a small distance measuring device can be obtained.

In addition, by finding a distance spectrum from a mixed wave of a progressive wave having a plurality of different frequency components and its reflected wave, we can find a distance between a measurement object and a mixed wave detection unit from the distance in which the distance spectrum size becomes the peak.

When the distance to a measurement object is measured by the use of a standing wave, it is, in principle, unable to make the observation time shorter than the time in which a standing wave is formed after the progressive wave frequency is changed over, the peak of the distance spectrum is subject to the Doppler effect and a measurement error is generated, but in the claimed invention, there is, in principle, no concept of changing over the frequency, and the observation time can be shortened to such a level that the Doppler effect is able to be virtually ignored, and an accurate distance can be measured.

(Simulation 2)

Next, based on the foregoing measurement principle 2, a simulation is carried out with a distance measuring device shown in FIG. 9.

The signal source 9 of the distance measuring device shown in FIG. 9 has a carrier wave signal source 9a that outputs a carrier wave signal of frequency $f_o$=24.0375 GHz and a modulating signal source 9b whose modulating signal m(t) is sine wave of frequency of 50 kHz and whose maximum frequency shift $f_D$=37.5 MHz, and outputs a signal of instantaneous frequency of $f_0+f_D\cdot m(t)$. A progressive wave $V_T$ expressed by Eq. (11) is transmitted from the transmission unit 2. A mixed wave $V_C$ (t, 0) of a reflected wave $V_{Rk}$ reflected by the kth measurement object 6 and the progressive wave $V_T$ is detected by a mixed wave detection unit 3. The mixed wave $V_C$ is observed throughout 1 cycle of the modulated signal m(t). Consequently, t=1/50 [kHz]=20 [μsec]. By the way, the mixed wave detection unit 3 is located at $x_s$=0. In addition, let the direction in which the velocity of the measurement object 6 recedes from the distance measuring device be positive and the direction in which it comes closer to the distance measuring device be negative.

The detected mixed wave $V_C$ is subject to envelope detection by an envelope detector and an amplitude component a(t, 0) of the mixed wave is detected (S120). When the amplitude component a(t, 0) of the mixed wave is detected, it is converted into a digital signal by an AD converter (S121). The digital-converted amplitude a(t,0) is subject to spectrum analysis, and the distance spectrum R(x) is found (S122). From the peak of the distance spectrum size found, the position of the measurement object 6 is calculated (S123).

(Simulation 2-1)

FIG. 10 are graphs that simulate the distance measurement when the measurement object 6 remains stationary at a distance of 10 meters from the mixed wave detection unit 3 and at the velocity per hour of 0 km. FIG. 10(a) is a graph that shows the amplitude a(t, 0) of modulating signal m(t) and mixed wave. It is FIG. 10(b) that shows the size of distance spectrum after performing spectrum analysis on the basis of this. As clear from FIG. 10(b), the size of the distance spectrum has a large peak value at a distance of 10 meters. Based on this, under the stationary state, a correct distance can be measured in a short distance of tens of meters or less.

(Simulation 2-2)

FIG. 11 are graphs that simulate the distance measurement when the measurement object 6 moves from the mixed wave detection unit 3 at a distance of 10 meters and at a velocity per hour of +300 km. FIG. 11(a) is a graph that shows the amplitude a(t, 0) of modulating signal m(t) and mixed wave. It is FIG. 11(b) that shows the size of distance spectrum after performing spectrum analysis on the basis of this. As clear from FIG. 11(b), the size of the distance spectrum has a large peak value at a distance of 10 meters. Based on this, even when the measurement object is moving at +300 km, a correct distance can be measured as is the case of simulation 2-1.

(Simulation 2-3)

FIG. 12 are graphs that simulate the distance measurement when the measurement object 6 moves from the mixed wave detection unit 3 at a distance of 40 meters and at a velocity per hour of −50 km. FIG. 12(a) is a graph that shows the amplitude a(t, 0) of modulating signal m(t) and mixed wave. It is FIG. 12B that shows the size of distance spectrum after performing spectrum analysis on the basis of this. As clear from FIG. 12(b), the size of the distance spectrum has a large peak value at a distance of 40 meters. Based on this, even when the distance, travel speed, and travel direction of the measurement object are changed, a correct distance can be measured.

(Simulation 2-4)

FIG. 13 are graphs that simulate the distance measurement when there are two measurement objects 6 and 6 and one measurement object 6 moves from the mixed wave detection unit 3 at a distance of 5 meters and at a velocity per hour of +100 km, while the other measurement object 6 moves from the mixed wave detection unit 3 at a distance of 12.5 meters and at a velocity per hour of −300 km. FIG. 13(a) is a graph that shows the amplitude a(t, 0) of modulating signal m(t) and mixed wave. It is FIG. 13B that shows the size of distance spectrum after performing spectrum analysis on the basis of this. As clear from FIG. 13(b), the size of the distance spectrum has large peak values at distances of 5 meters and 12.5 meters. Based on this, even when there are a plurality of measurement objects, a correct distance can be measured. In addition, even in a short distance of 10 meters or less, a correct distance can be measured. Furthermore, even in the case that distances of a plurality of measurement objects come closer and the velocity difference is large, the position of each measurement object is able to be correctly measured.

As clear from the foregoing simulations 2-1 through 2-4, regardless of the velocity of a measurement object, the distance of the measurement object is able to be measured. Furthermore, even in the case that distances of a plurality of measurement objects come closer and the velocity difference is large, which is difficult to measure with a distance measuring device using a standing wave, the position of each measurement object is able to be correctly measured.

In the foregoing description, a mixed wave is detected by one mixed wave detection unit 3, but as shown in FIG. 14, a plurality of mixed wave detection units 3, . . . , 3 may be disposed at different positions $x_{s1}, \ldots, x_{sN}$, which are different from one another. The mixed wave $V_C$ detected by a plurality of mixed wave detectors 3, . . . , 3 in this way detects the amplitude component (amplitude a(t, $x_{si}$) (i denotes 1, 2, . . . , N, . . . )) of the mixed wave by detecting the envelope by an envelope detector for each mixed wave $V_C$ detected by each mixed wave detection unit 3 (S130), the each amplitude a(t, $x_{si}$) detected is AD-converted by an AD converter (S131), and by removing a difference between any two amplitudes (for example, a(t, $x_{s1}$) and a(t, $x_{s2}$)) of the amplitudes converted into digital signals, unnecessary direct current components (first term of Eq. (18)) is eliminated (S132), and each amplitude a(t, $X_{s1}$) without an unnecessary direct current component is subject to spectrum analysis to find a distance spectrum (S133), and after averaging each distance spectrum (S134), the distance to the measurement object is calculated on the basis of the peak of the distance spectrum size (S135). These can be achieved by equipping, for example, a direct current component eliminating means that finds a difference of any two amplitudes and eliminates an unnecessary direct current component and a distance spectrum averaging means that calculates the average of a plurality of distance spectra to the distance calculation unit 5. By the way, the direct current component may be removed by an analog circuit (differential amplifier, etc.) and thereafter it may be AD-converted.

Consequently, in the event that a plurality of mixed wave detection units 3 are installed to configure a signal processor as shown in FIG. 14, unnecessary direct current components can be eliminated. In addition, the distance spectrum obtained from each amplitude a(t, $x_{si}$) is averaged, noise components are reduced, and the distance can be measured more accurately.

Third Embodiment

A technical outline of the third embodiment of the distance measuring device and the distance measuring method related to the claimed invention will be described as follows.
(Technical Outline 3)

FIG. 15 is an illustration that explains the outline of a distance measuring device related to the claimed invention. The distance measuring device related to the claimed invention transmits a signal outputted from a signal source 13 as an undulation from a transmission unit 2 to a measurement object 6, detects a mixed wave $V_C$ of a reflected wave $V_{Rk}$ reflected from the kth measurement object 6 and a progressive wave $V_T$ at a mixed wave detection unit 3, processes this mixed wave $V_C$ with a signal processor 14, and finds the distance to the measurement object 6. The signal processor 14 comprises an amplitude component detection unit 15, single frequency selection unit 16, signal level detection unit 17, and distance calculation unit 18, and an amplitude component (a(t, $x_s$)) of the mixed wave is detected by the amplitude component detection unit 15, the signal (R(x(t))) of a component of a specific frequency $f_B$ only is selected by the single frequency selection unit 16, a signal level (|R(x(t))|) of the selected signal is detected by the signal level detection unit 17, and from this signal level, the distance to the measurement object 6 is measured by the distance calculation unit 18.

The signal source 13 outputs a signal of doubly frequency-modulated carrier wave of a specific frequency (a double modulated signal) by a second modulating signal which is modulated in advance by first modulating signal and outputs a signal always containing two or more frequency components.

For a specific example, as shown in FIG. 15, the signal source 13 comprises a carrier wave signal source 13a, a second modulating signal source 13b, and a first modulating signal source 13c. The first modulating signal source 13c outputs a first modulating signal x(t) of a specific first cycle. The second modulating signal source 13b outputs a second modulating signal m(t), and the second modulating signal m(t) is a periodical signal of a specific second cycle oscillated by the second modulating signal source 13b, which is frequency-modulated by the first modulating signal x(t). The carrier wave signal source 13a outputs a double modulated signal of instantaneous frequency $f_0+f_D\cdot m(t)$ and frequency-modulates a carrier wave oscillated by the carrier wave signal source 13a by the second modulating signal m(t).

That is, the double modulated signal outputted from the signal source 13 in the claimed invention is a carrier wave signal frequency-modulated by the second modulating signal m(t) and the second modulating signal m(t) is frequency-modulated by the first modulating signal x(t). Consequently, the double modulated signal in the claimed invention is neither a signal further frequency-modulated by the first-modulating signal x(t) after a carrier wave signal is frequency-modulated by the second-modulating signal m(t) nor a signal further frequency-modulated by the second-modulating signal m(t) after a carrier wave signal is frequency-modulated by the first-modulating signal x(t).

In addition, as another specific example of signal source 13, as shown in FIG. 16(a), the signal source 13 comprises the carrier wave signal source 13a (carrier wave generating means), a second modulating signal generating means 13d, and a second modulating signal storage means 13e. The second modulating signal storage means 13e stores the data for outputting the second modulating signal m(t), and the second modulating signal generating means 13d reads out the data stored in the second modulating signal storage means 13e, and output the second modulating signal m(t). The carrier wave signal source 13a oscillates a carrier wave of a specific frequency, frequency-modulates this carrier wave by the second modulating signal m(t), and outputs a double modulated signal of the instantaneous frequency $f_0+f_D\cdot m(t)$.

The second modulating signal generating means 13d is configured by a microprocessor and others, but it only generates the second modulating signal in accordance with the data stored in advance; therefore, a processor of lower function as compared to a microprocessor used for Fourier analysis (frequency analysis) in the measurement principles 1 and 2 can be used and a low cost can be achieved.

Furthermore, as shown in 16(b), the signal source 13 may comprise a double modulated signal generating means equipped with a microprocessor and a-double modulated signal storage means 13g which stores data for outputting a double modulated signal of instantaneous frequency $f_0+f_D \cdot m(t)$, and the data stored in the double modulated signal storage means 13g is read by the double modulated signal generating means 13f to generate a double modulated signal.

The double modulated signal generating means 13f is equipped with a microprocessor, too, but a processor of lower function as compared to a microprocessor used for Fourier analysis (frequency analysis) can be used and a low cost can be achieved.

The transmission unit 2 is a bidirectional element such as antenna (or electrode) to transmit a signal outputted from the signal source 13 as an undulation. In the event that the mixed wave detection unit 3 is disposed between the signal source 13 and the transmission unit 2, the transmission unit 2 may undertake a role to receive a reflected wave. The transmission unit 2 outputs undulation of frequency components outputted from the signal source 13, and the outputted undulation is transmitted to the measurement object 6.

By the way, a progressive wave $V_T$ in the claimed invention means an undulation transmitted from the transmission unit 2 and a signal outputted from the signal source 13.

Consequently, in the event that a mixed wave of a signal from the signal source 13 and a signal of a reflected wave returned via the transmission unit 2 is detected by the mixed wave detection unit 3, the signal from the signal source 13 is the progressive wave $V_T$.

The mixed wave detection unit 3 detects a mixed wave $V_C$ of the progressive wave $V_T$ and the reflected wave $V_{Rk}$. This mixed wave detection unit 3 may be configured by a coupler with no directionality to detect a mixed wave $V_C$ of a progressive wave $V_T$ outputted from the signal source 13 and a reflected wave $V_{Rk}$ returned via the transmission unit 2 in the midway of a power feeder that connects the signal source 13 to the transmission unit 2. In addition, a reception antenna (or electrode) to detect the mixed wave $V_C$ of the progressive wave $V_T$ and the reflected wave $V_{Rk}$ is installed in a space between the transmission unit 2 and the measurement object 6 and may be used for the mixed wave detection unit 3.

The amplitude component detection unit 15 detects an amplitude component of the mixed wave $V_C$ detected by the mixed wave detection unit 3, and is configured by any of an envelope detector, a square-law detector, a synchronous detector, a quadrature detector, and others.

The single frequency selection unit 16 selects one frequency component from amplitude components of mixed wave $V_C$ detected by the amplitude component detection unit 15 and comprises any of a quadrature detector, a band pass filter, a matched filter, and other devices.

The signal level detection unit 17 detects a level of a signal obtained by the single frequency selection unit 16, and comprises any of an envelope detector, square-law detector, and other devices. In addition, the signal level detection unit 17 may comprise an AD converter, microprocessor, and others and an output signal from the single frequency selection unit 16 may be AD-converted and the signal level may be calculated by a microprocessor.

The distance calculation unit 18 calculates the distance to the measurement object 6 on the basis of the peak of a signal level detected by the signal level detection unit 17.

(Measurement Principle 3)

Referring now to FIG. 15 to FIG. 19, the measuring principle will be described for the distance measuring device and the distance measuring method related to the claimed invention as follows.

When the signal source 13 doubly frequency-modulates a carrier wave of a specific frequency by a second modulating signal which has been frequency-modulated by a first modulating signal and outputs a double modulated signal of instantaneous frequency $f_0+f_D \cdot m(t)$, the progressive wave $V_T$ at an elapsed time t from the start of measurement and at position x becomes a frequency-modulated continuous wave as expressed by the following Eq. (20):

[Eq. 20]
$$V_T(t,x) = Ae^{j\theta} \cdot e^{j2\pi f_0(t-\frac{x}{c})} \cdot e^{j2\pi f_D \int m(t-\frac{x}{c})dt} \qquad \text{Eq. (20)}$$

where, t denotes the elapsed time from the start of measurement, c denotes the velocity of light, A amplitude, θ the phase, and any one point on the x-axis is x=0. In addition, m(t) is a stepwise signal in which an instantaneous value increases by Δx in the first cycle T as shown in the second modulating and following Eq. (22), and is a saw-tooth wave shown by FIG. 17 and the following Eq. (21):

[Eq. 21]
$$m(t)=2(f_m t-[f_m t])-1 \qquad \text{Eq. (21)}$$

However, □ shows a maximum integer value that does not exceed the value. m(t) is a saw-tooth wave of frequency fm, minimum value −1, and maximum value +1 as shown in FIG. 17.

By the way, the recovery time of the saw-tooth wave shown in FIG. 17 is zero but it may be a saw-tooth wave which has the recovery time (that is, triangular wave).

x(t) is a first modulating signal to change frequency $f_m$ of m(t), and is a signal of FIG. 18 (step-form).

[Eq. 22]
$$x(t) = \Delta x \left[\frac{t}{T} + 1\right] \qquad \text{Eq. (22)}$$

That is, when x(t)=NΔx, (N=1, 2, . . . ), m(t) is frequency-modulated so that the frequency $f_m$ of m(t) achieves the following Eq. (23):

[Eq. 23]
$$f_m = \frac{\eta c}{2N\Delta x} \qquad \text{Eq. (23)}$$
(η is constant)

By the way, x(t) is a steplike signal which increases by Δx in a specific first cycle but the same principle is applied even when x(t) is made a steplike signal which decreases by Δx. In the remainder of this section, a steplike signal which increases x(t) by Δx will be discussed.

It is obvious, but the first cycle T of the first modulating signal is longer than the cycle of a saw-tooth wave (repetition time) of the second modulating signal. In addition, the cycle of the saw-tooth wave of the second modulating signal is longer than the cycle of a carrier wave.

Let $d_k$ denote the distance of kth measurement object 6, $v_k$ the velocity, $Y_k$ and $\phi_k$ the size of the reflection coefficient and the phase, respectively; the reflected wave $V_{Rk}$ from the measurement object 6 can be expressed as the following Eq. (24), where k=1, 2 . . . :

[Eq. 24]

$$V_{Rk}(t, x) = A\gamma_k e^{j\phi_k} \cdot e^{j\theta} \cdot e^{j2\pi f_0 \left(t - \frac{2(d_k + v_k t) - x}{c}\right)} \cdot e^{j2\pi f_D \int m\left(t - \frac{2(d_k + v_k t) - x}{c}\right)dt} \quad \text{Eq. (24)}$$

In such event, the signal $V_C$ of a mixed wave detected by the mixed wave detection unit 3 located at the $x=x_s$ can be expressed by the following Eq. (25):

[Eq. 25]

$$V_C(t, x_s) = V_T(t, x_s) + \sum_{k=1}^{n} V_{Rk}(t, x_s) \quad \text{Eq. (25)}$$

$$= Ae^{j\theta} \cdot e^{j2\pi f_0\left(t - \frac{x_s}{c}\right)} \cdot e^{j2\pi f_D \int m\left(t - \frac{x_s}{c}\right)dt} \cdot$$

$$\left[1 + \sum_{k=1}^{n} \gamma_k e^{j\phi_k} e^{-j\frac{4\pi f_0}{c}(d_k + v_k t - x_s)} \cdot e^{j2\pi f_D \int \left[m\left(t - \frac{2(d_k + v_k t) - x_s}{c}\right) - m\left(t - \frac{x_s}{c}\right)\right]dt}\right]$$

And the amplitude of signal $V_C$ can be expressed by the following Eq. (26):

[Eq. 26]

$$a(t, x_s) = |V_C(t, x_s)| \quad \text{Eq. (26)}$$

$$= A \cdot \left| 1 + \sum_{k=1}^{n} \gamma_k e^{j\phi_k} e^{-j\frac{4\pi f_0}{c}(d_k + v_k t - x_s)} \cdot e^{j2\pi f_D \int \left[m\left(t - \frac{2(d_k + v_k t) - x_s}{c}\right) - m\left(t - \frac{x_s}{c}\right)\right]dt} \right|$$

Because realistically, the size of the reflected wave can be assumed extremely small, $Y_k \ll 1$ and the term of second degree of $Y_k$ and higher are able to be ignored as nearly zero. Consequently, it can be approximated as the following Eq. (27):

[Eq. 27]

$$a(t, x_s) \approx A \cdot \left[ 1 + \sum_{k=1}^{n} \gamma_k \cos\left\{ \phi_k - \frac{4\pi f_0}{c}(d_k + v_k t - x_s) + 2\pi f_D \int \left[ m\left(t - \frac{2(d_k + v_k t) - x_s}{c}\right) - m\left(t - \frac{x_s}{c}\right) \right] dt \right\} \right] \quad \text{Eq. (27)}$$

Now, if by making t sufficiently small, $v_k t \equiv 0$ could be regarded, the amplitude of $V_C$ can be approximated like the following Eq. (28) and effect of the velocity $v_k$ can be eliminated:

[Eq. 28]

$$a(t, x_s) \approx A \cdot \left[ 1 + \left| \sum_{k=1}^{n} \gamma_k \cos\left\{ \phi_k - \frac{4\pi f_0}{c}(d_k - x_s) + 2\pi f_D \int \left[ m\left(t - \frac{2d_k - x_s}{c}\right) - m\left(t - \frac{x_s}{c}\right) \right] dt \right\} \right| \right] \quad \text{Eq. (28)}$$

Furthermore, approximating as the following Eq. (29)

[Eq. 29]

$$\frac{m\left(t - \frac{2d_k - x_s}{c}\right) - m\left(t - \frac{x_s}{c}\right)}{-2\frac{d_k - x_s}{c}} \approx \frac{d}{dt} m(t) \quad \text{Eq. (29)}$$

Eq. (28) becomes the following Eq. (30).

[Eq. 30]

$$a(t, x_s) \approx 1 + \sum_{k=1}^{n} \gamma_k \cos\left\{ \frac{4\pi(f_0 + f_D \cdot m(t))}{c}(d_k - x_s) - \phi_k \right\} \quad \text{Eq. (30)}$$

where, A=1 because the constant A has no information in the claimed invention.

When $x(t)=N\Delta x$, the amplitude component $f_k$ of kth measurement object 6 is able to be found like the following Eq. (31) by differentiating the phase of $a(t, x_s)$:

[Eq. 31]

$$f_k = \frac{1}{2\pi} \frac{d}{dt} \left\{ \frac{4\pi(f_0 + f_D \cdot m(t))}{c}(d_k - x_s) - \phi_k \right\} \quad \text{Eq. (31)}$$

$$= \frac{2f_D(d_k - x_s)}{c} \cdot \frac{dm(t)}{dt}$$

$$= \frac{4f_m f_D(d_k - x_s)}{c}$$

$$= 2\eta f_D \frac{d_k - x_s}{N\Delta x}$$

When $x(t)=N\Delta x$ is equal to $d_k - x_s$, the distance between the measurement object 6 and the mixed wave detection unit, $f_k$ is the frequency $f_B$ given by the following Eq. (32):

[Eq. 32]

$$f_B = 2\eta f_D \quad \text{Eq. (32)}$$

Consequently, if $a(t, x_s)$ is allowed to pass the single frequency selection unit 16 such as a quadrature detector, band pass filer, etc., the component of frequency $f_B$ only is selected, and the signal level is detected, it is able to know whether the measurement object 6 exists at the distance of $x(t)=N\Delta x$.

In the event that a quadrature detector is used as the single frequency selection unit 16 to select a component of frequency $f_B$, the quadrature detection output $R(x(t))$ at $x(t)=N\Delta x$ can be found by the following Eq. (33):

[Eq. 33]

$$R(x(t)) = \int_{(N-1)T}^{NT} a(t, x_s) \cdot e^{j2\pi f_B t} dt \qquad \text{Eq. (33)}$$

By the way, the quadrature detection output R(x(t)) is called a distance spectrum.

The level (size) of the distance spectrum R(x(t)) is expressed by its absolute value. That is |R(x(t))| is represented by the following Eq. (34):

[Eq. 34]

$$|R(x(t))| = \sqrt{\{\int_{(N-1)T}^{NT} a(t, x_s) \cdot \cos(2\pi f_B t) dt\}^2 + \{\int_{(N-1)T}^{NT} a(t, x_s) \cdot \sin(2\pi f_B t) dt\}^2} \qquad \text{Eq. (34)}$$

As described above, in the distance measuring device and the distance measuring method related to the claimed invention, a mixed wave of a progressive wave and a reflected wave reflected by a measurement object is detected; therefore, there is no need to separate the progressive wave and the reflected wave and a simple construction can be achieved, and a low-cost and a small distance measuring device can be obtained.

In addition, by finding a distance spectrum from a mixed wave of a progressive wave having a plurality of different frequency components and its reflected wave, we can find a distance between a measurement object and a mixed wave detection unit from the distance in which the distance spectrum size becomes the peak.

When the distance to a measurement object is measured by the use of a standing wave, it is, in principle, unable to make the observation time shorter than the time in which a standing wave is formed after the progressive wave frequency is changed over, the peak of the distance spectrum is subject to the Doppler effect and a measurement error is generated, but in the claimed invention, there is, in principle, no concept of changing over the frequency, and the observation time can be shortened to such a level that the Doppler effect is able to be virtually ignored, and an accurate distance can be measured.

Furthermore, no microprocessor, etc. which can perform spectrum analysis at high speed is used but a signal processor is configured by an envelope detector, square-law detector, synchronous detector, quadrature detector, band pass filter, matched filter, and other devices and the size (signal level) of a distance spectrum is detected: therefore, a signal processor of processing speed nearly same as that of a signal processor for which a microprocessor, etc. are used can be obtained at low cost. That is, even at low cost, a distance measuring device of high signal processing speed is able to be obtained.

(Simulation 3)

Next, based on the foregoing measurement principle 3, simulation will be conducted by the use of a distance measuring device shown in FIGS. 19 and 21.

In this simulation, as shown in FIGS. 19 and 21, the distance measuring device has a sinusoidal wave of frequency $f_0=24.1$ GHz, maximum frequency shift $f_D=37.5$ MHz, a modulating cycle of a first modulating signal $T=20$ μsec, increase of an instantaneous value of the first modulating signal $\Delta x=0.2$ m, and constant that determines the frequency of the second modulating signal $m(t)$ $\eta=1/75$, and outputs a signal of instantaneous frequency $f_0+f_D \cdot m(t)$. And a progressive wave $V_T$ expressed by Eq. (20) is transmitted from the transmission unit 2. A mixed wave $V_C(t, 0)$ of a reflected wave $V_{Rk}$ reflected by the kth measurement object 6 and the progressive wave $V_T$ is detected by the mixed wave detection unit 3. Based on the detected mixed wave $V_C$, a signal processor 19 (24) calculates the position of the measurement object 6.

(Simulation 3-1)

FIG. 19 is an illustration of a distance measuring device having a signal processor 19 configured with an envelope detector 20 that detects an amplitude component, a quadrature detector 21 that selects the component of frequency $f_B=1$ MHz only, a level detection unit 22 that detects a signal level, and a distance calculation unit 23.

FIG. 20 is a graph that shows the position (x(t)) and the size of a distance spectrum |R(x(t))| when simulation is conducted under the conditions in which two measurement objects 6 and 6 are located at $d_1=12$ m and $d_2=20$ m, respectively, a reflection coefficient $Y_1=0.01$ and phase $\phi_1=\tau$ for the measurement object 6 located at $d_1=12$ m, and the reflection coefficient $Y_2=0.01$ and phase $\phi_2=\tau$ for the measurement object 6 located at $d_2=20$ m. As clear from FIG. 20, the peaks of the size of the distance spectrum are obtained at 12 m and 20 m, respectively. This indicates that even if a quadrature detector, etc. are used in place of a microprocessor, etc., a correct distance is able to be measured.

(Simulation 3-2)

FIG. 21 is an illustration of a distance measuring device having a signal processor 24 configured with an envelope detector for amplitude component detection 25, two band pass filters 26a and 26b, an envelope detector for signal level detection 27, and a distance calculation unit 28.

FIG. 22 is a graph that shows the position (x(t)) and the size of a distance spectrum |R(x(t))| when simulation is conducted under the conditions in which two measurement objects 6 and 6 are located at $d_1=12$ m and $d_2=20$ m, respectively, a reflection coefficient $Y_1=0.01$ and phase $\phi_1=\tau$ for the measurement object 6 located at $d_1=12$ m, the reflection coefficient $Y_2=0.01$ and phase $\phi_2=\tau$ for the measurement object 6 located at $d_2=20$ m, the band pass filter selects frequency $f_B=1$ MHz, and $Q=20$.

As clear from FIG. 22, the peaks of the size of the distance spectrum are obtained at 12 m and 20 m, respectively. This indicates that even if a band pass filter, etc. are used in place of a microprocessor, etc., a correct distance is able to be measured. In the present example, two band pass filters are connected in series, but the number of band pass filters shall not be limited to 2 but needless to say, arbitrary number of band pass filters can be used according to need.

By the way, in the above-mentioned description, a mixed wave is detected by one mixed wave detection unit 3, but a plurality of mixed wave detection units 3, . . . , 3 may be arranged in different locations, respectively, and based on the mixed waves detected from them, the distance spectrum is found and the position of the measurement target 6 may be measured.

INDUSTRIAL APPLICABILITY

The present invention is able to be used as a collision prevention system by equipping the distance measuring device to mobile bodies such as automobiles, etc., liquid and powder level measurement sensors, or sensors that detect the presence and the position of a person in a security system.

The invention claimed is:

1. A distance measuring device that measures distance to a measurement object, comprising:
    a signal source that outputs a signal having a plurality of different frequency components in a specific bandwidth;

a transmission unit that transmits the signal as an undulation;

a mixed wave detection unit that detects a mixed wave of a progressive wave including either the undulation transmitted from the transmission unit or the signal outputted from the signal source and a reflected wave of the undulation transmitted from the transmission unit being reflected by the measurement object;

a frequency component analysis unit that analyzes the frequency component of the mixed wave detected by the mixed wave detection unit, wherein a relationship between a position in a space and amplitude of the mixed wave temporally changes differently from the standing wave; and a distance calculation unit that finds a distance spectrum by subjecting the analyzed data further to spectrum analysis and calculates the distance to the measurement object.

2. The distance measuring device according to claim 1, wherein the signal source comprises a plurality of single frequency oscillators, each of which oscillates a different single frequency component and an adder which synthesizes signals oscillated from the plurality of single frequency oscillators.

3. The distance measuring device according to claim 1, wherein the signal source comprises a single frequency oscillator that oscillates a single frequency component and a modulator that modulates a signal oscillated from the single frequency oscillator.

4. The distance measuring device according to claim 1, wherein the signal source comprises a noise source that outputs a frequency component within the particular bandwidth.

5. The distance measuring device according to claim 1, wherein the frequency component analysis unit includes an AD converter that converts the mixed wave detected by the mixed wave detection unit to a digital signal and a signal processor that analyzes frequency components of the output data from the AD converter and calculates the size of each frequency component.

6. The distance measuring device according to claim 1, wherein the frequency component analysis unit includes a plurality of band pass filters and a level detection unit that detects the output level of the band pass filter.

7. The distance measuring device according to claim 1, wherein the distance calculation unit calculates the distance spectrum by subjecting the analyzed data by the frequency component analysis unit to Fourier analysis.

8. The distance measuring device according to claim 1, wherein
a plurality of the mixed wave detection units are arranged in different positions;
the frequency component analysis unit analyzes frequency components for each mixed wave detected by the mixed wave detection units; and
the distance calculation unit calculates a distance spectrum by the use of the frequency component analyzed data of the plurality of mixed waves obtained.

9. A distance measuring method that measures distance to a measurement object, comprising steps of:
transmitting a signal having a plurality of different frequency components within a particular bandwidth as an undulation;
detecting a mixed wave of a progressive wave including either the undulation transmitted or the signal and a reflected wave of the undulation transmitted being reflected by the measurement object;
analyzing the frequency component of the mixed wave detected, wherein a relationship between a position in a space and amplitude of the mixed wave temporally changes differently from the standing wave; and
finding a distance spectrum by subjecting the analyzed data with the frequency component analysis further to spectrum analysis, and thereby calculating the distance to the measurement object.

10. A distance measuring device that measures distance to a measurement object, comprising:
a signal source that outputs a frequency modulated signal obtained by frequency-modulating a carrier wave of a specific frequency by an arbitrary frequency signal,
a transmission unit that transmits the frequency modulated signal as an undulation;
a mixed wave detection unit for detecting a mixed wave of a progressive wave including either the undulation transmitted from the transmission unit or the frequency-modulated signal outputted from the signal source and a reflected wave of the undulation transmitted from the transmission unit being reflected by the measurement object;
an amplitude component detection unit that detects an amplitude component of the mixed wave detected by the mixed wave detection unit, wherein a relationship between a position in a space and amplitude of the mixed wave temporally changes differently from the standing wave; and
a distance calculation unit that finds a distance spectrum by subjecting the amplitude component detected by the amplitude component detection unit further to spectrum analysis and calculates the distance to the measurement object.

11. The distance measuring device according to claim 10, wherein the distance calculation unit calculates the distance spectrum by subjecting the amplitude component detected by the amplitude component detection unit to Fourier analysis.

12. The distance measuring device according to claim 11, wherein
a plurality of the mixed wave detection units are arranged in different positions;
the amplitude component detection unit detects amplitude components for each mixed wave detected by the mixed wave detection units; and
the distance calculation unit calculates a distance spectrum by the use of the amplitude component data of the plurality of mixed waves obtained.

13. A distance measuring method that measures distance to a measurement object, comprising steps of:
transmitting a signal obtained by frequency-modulating a carrier wave of a specific frequency by an arbitrary frequency signal as an undulation;
detecting a mixed wave of a progressive wave including either the undulation transmitted or the frequency-modulated signal and a reflected wave of the undulation transmitted being reflected by the measurement object;
detecting the amplitude component of the mixed wave detected, wherein a relationship between a position in a space and amplitude of the mixed wave temporally changes differently from the standing wave; and
finding a distance spectrum by subjecting the amplitude component further to spectrum analysis, and thereby calculating the distance to the measurement object.

14. A distance measuring device that measures distance to a measurement object, comprising:
a signal source that outputs a double-frequency modulated signal obtained by double-frequency-modulating a carrier wave of a specific frequency by a second modulating signal frequency-modulated in advance by the first modulating signal;

a transmission unit that transmits the double-frequency modulated signal as an undulation;

a mixed wave detection unit for detecting a mixed wave of a progressive wave including either the undulation transmitted from the transmission unit or the double-modulated signal outputted from the signal source and a reflected wave of the undulation transmitted from the transmission unit being reflected by the measurement object;

an amplitude component detection unit that detects an amplitude component of the mixed wave detected by the mixed wave detection unit, wherein a relationship between a position in a space and amplitude of the mixed wave temporally changes differently from the standing wave;

a single frequency selection unit that selects a specific one frequency component from amplitude components detected by the amplitude component detection unit;

a signal level detection unit that detects the level of a signal obtained by the single-frequency selection unit; and a distance calculation unit that calculates the distance to the measurement object on the basis of the signal level obtained by the signal level detection unit.

15. The distance measuring device according to claim 14, wherein the signal source generates the first modulating signal, the second modulating signal modulated by the first modulating signal, and the carrier wave, individually; or the signal source has a double modulated signal storage means that stores in advance the double modulated signal; or the signal source has a second modulating signal storage means that stores in advance the second modulating signal and a carrier wave generating means that generates the carrier wave.

16. The distance measuring device according to claim 15, wherein the first modulating signal is a signal that draws a waveform that increases or decreases stepwise in a specific first cycle; and the second modulating signal is a signal obtained by modulating a saw-tooth wave of a cycle shorter than the first cycle modulated by the first modulating signal.

17. A distance measuring method that measures distance to a measurement object, comprising steps of:

transmitting a double-modulated signal obtained by double-frequency-modulating a carrier wave of a specific frequency by a second modulating signal frequency-modulated in advance by a first modulating signal as an undulation;

detecting a mixed wave of a progressive wave including either the undulation transmitted or the double-frequency-modulated signal and a reflected wave of the undulation transmitted from the transmission unit being reflected by the measurement object;

detecting an amplitude component of the mixed wave detected, wherein a relationship between a position in a space and amplitude of the mixed wave temporally changes differently from the standing wave;

selecting one specific frequency component from the amplitude components;

detecting the level of a signal of the selected frequency component; and calculating the distance to the measurement object on the basis of the signal level.

18. The distance measuring device according to claim 10, wherein a plurality of the mixed wave detection units are arranged in different positions;

the amplitude component detection unit detects amplitude components for each mixed wave detected by the mixed wave detection units; and the distance calculation unit calculates a distance spectrum by the use of the amplitude component data of the plurality of mixed waves obtained.

19. The distance measuring device according to claim 14, wherein the first modulating signal is a signal that draws a waveform that increases or decreases stepwise in a specific first cycle; and the second modulating signal is a signal obtained by modulating a sawtooth wave of a cycle shorter than the first cycle modulated by the first modulating signal.

* * * * *